(12) United States Patent
Ge et al.

(10) Patent No.: US 12,650,533 B2
(45) Date of Patent: *Jun. 9, 2026

(54) SELECTION AND REMOVAL OF ACOUSTIC BASELINE SIGNAL FOR ENHANCED CEMENT BOND EVALUATION

(71) Applicant: Halliburton Energy Services, Inc., Houston, TX (US)

(72) Inventors: Yao Ge, Singapore (SG); Ruijia Wang, Singapore (SG); Xiang Wu, Singapore (SG)

(73) Assignee: Halliburton Energy Services, Inc., Houston, TX (US)

( * ) Notice: Subject to any disclaimer, the term of this patent is extended or adjusted under 35 U.S.C. 154(b) by 48 days.

This patent is subject to a terminal disclaimer.

(21) Appl. No.: 18/483,044

(22) Filed: Oct. 9, 2023

(65) Prior Publication Data

US 2024/0103193 A1 Mar. 28, 2024

Related U.S. Application Data

(63) Continuation of application No. 17/955,162, filed on Sep. 28, 2022, now Pat. No. 11,815,643.

(51) Int. Cl.
| | |
|---|---|
| *G01V 1/50* | (2006.01) |
| *G01V 1/48* | (2006.01) |
| *E21B 47/005* | (2012.01) |

(52) U.S. Cl.
CPC .................. *G01V 1/50* (2013.01); *G01V 1/48* (2013.01); *E21B 47/005* (2020.05); *G01V 2210/1299* (2013.01); *G01V 2210/1429* (2013.01)

(58) Field of Classification Search
CPC .... G01V 1/50; G01V 1/48; G01V 2210/1299; G01V 2210/1429; E21B 47/005; E21B 2200/22
See application file for complete search history.

(56) References Cited

U.S. PATENT DOCUMENTS

| | | | | |
|---|---|---|---|---|
| 4,661,933 A | * | 4/1987 | Seeman | ................. G01B 17/00 |
| | | | | 367/27 |
| 4,703,427 A | | 10/1987 | Catala et al. | |

(Continued)

FOREIGN PATENT DOCUMENTS

| | | |
|---|---|---|
| WO | 2018064170 | 4/2018 |
| WO | 2019240952 | 12/2019 |

OTHER PUBLICATIONS

International Search Report and Written Opinion for International Patent Application No. PCT/US2022/046470 dated Jun. 16, 2023.

(Continued)

*Primary Examiner* — Amine Benlagsir

(74) *Attorney, Agent, or Firm* — John Wustenberg; C. Tumey Law Group PLLC-HES

(57) ABSTRACT

A method and system for generating an acoustic log. The method may comprise disposing an acoustic logging tool in a wellbore, broadcasting a shaped signal with the acoustic logging tool such that the shaped signal interacts with a boundary of a casing and a material, recording a result signal from the boundary with the acoustic logging tool, and decomposing the result signal into a resonance mode. The method may further comprise applying a bandpass filter to the resonance mode to form a filtered signal, selecting a baseline signal from the filtered signal, removing the baseline signal from the filtered signal, and generating a log from the filtered signal. The system may comprise an acoustic logging tool. The acoustic logging tool may comprise at least one transmitter and at least one receiver. The system may further comprise a conveyance and an information handling system communicatively connected to the acoustic logging tool.

20 Claims, 17 Drawing Sheets

(56)  References Cited

U.S. PATENT DOCUMENTS

| | | | | | |
|---|---|---|---|---|---|
| 4,928,269 | A | | 5/1990 | Kimball et al. | |
| 4,951,266 | A | * | 8/1990 | Hsu | G01V 1/48 |
| | | | | | 367/43 |
| 5,081,613 | A | * | 1/1992 | Holzhausen | E21B 47/00 |
| | | | | | 73/152.16 |
| 5,616,840 | A | * | 4/1997 | Tang | G01V 1/48 |
| | | | | | 73/152.16 |
| 5,677,631 | A | * | 10/1997 | Reittinger | E21B 47/113 |
| | | | | | 324/324 |
| 5,869,968 | A | * | 2/1999 | Brooks | G01V 3/30 |
| | | | | | 324/338 |
| 6,714,153 | B1 | * | 3/2004 | Kong | G01V 3/30 |
| | | | | | 342/195 |
| 8,270,248 | B2 | | 9/2012 | Hurst et al. | |
| 2004/0049134 | A1 | * | 3/2004 | Tosaya | A61H 23/0236 |
| | | | | | 601/2 |
| 2006/0077757 | A1 | * | 4/2006 | Cox | G01V 1/40 |
| | | | | | 367/25 |
| 2006/0133205 | A1 | * | 6/2006 | Van Kuijk | E21B 47/005 |
| | | | | | 367/35 |
| 2006/0285439 | A1 | | 12/2006 | Haugland | |
| 2007/0153629 | A1 | * | 7/2007 | Drumheller | G01V 1/523 |
| | | | | | 367/76 |
| 2015/0198030 | A1 | * | 7/2015 | Tello | E21B 47/005 |
| | | | | | 367/86 |
| 2017/0058660 | A1 | | 3/2017 | Hunter et al. | |
| 2018/0153205 | A1 | | 6/2018 | Wu | |
| 2019/0018161 | A1 | | 1/2019 | Wang et al. | |
| 2019/0018162 | A1 | | 1/2019 | Wang et al. | |

| | | | | | |
|---|---|---|---|---|---|
| 2019/0025452 | A1 | | 1/2019 | Wang et al. | |
| 2019/0204468 | A1 | | 7/2019 | Ge et al. | |
| 2019/0293823 | A1 | | 9/2019 | Sun et al. | |
| 2020/0072036 | A1 | | 3/2020 | Wang | |
| 2020/0116883 | A1 | | 4/2020 | Padhl et al. | |
| 2020/0116884 | A1 | | 4/2020 | Weng et al. | |
| 2020/0271811 | A1 | | 8/2020 | Wilson et al. | |
| 2020/0271821 | A1 | | 8/2020 | Wang | |
| 2020/0341163 | A1 | | 10/2020 | Wang et al. | |
| 2020/0391247 | A1 | | 12/2020 | Jin et al. | |
| 2021/0108510 | A1 | | 4/2021 | Ge et al. | |
| 2021/0109243 | A1 | | 4/2021 | Ge et al. | |
| 2021/0124076 | A1 | * | 4/2021 | Ge | G01V 1/48 |
| 2021/0222551 | A1 | | 7/2021 | Jin et al. | |
| 2021/0231008 | A1 | | 7/2021 | Stark et al. | |
| 2021/0238989 | A1 | | 8/2021 | Ang et al. | |
| 2021/0349229 | A1 | | 11/2021 | Wang et al. | |
| 2021/0396125 | A1 | | 12/2021 | Wang et al. | |
| 2021/0396126 | A1 | | 12/2021 | Wang et al. | |
| 2021/0396900 | A1 | | 12/2021 | Wang et al. | |
| 2021/0396901 | A1 | | 12/2021 | Zhao et al. | |
| 2021/0405231 | A1 | | 12/2021 | Wu et al. | |
| 2021/0405232 | A1 | | 12/2021 | LeBlanc et al. | |
| 2022/0179118 | A1 | | 6/2022 | Wang et al. | |
| 2022/0252750 | A1 | | 8/2022 | Wang et al. | |
| 2022/0276403 | A1 | | 9/2022 | Weng et al. | |
| 2022/0390637 | A1 | * | 12/2022 | Yogeswaren | E21B 47/0025 |

OTHER PUBLICATIONS

Notice of Allowance for U.S. Appl. No. 17/955,162 dated Aug. 3, 2023.

* cited by examiner

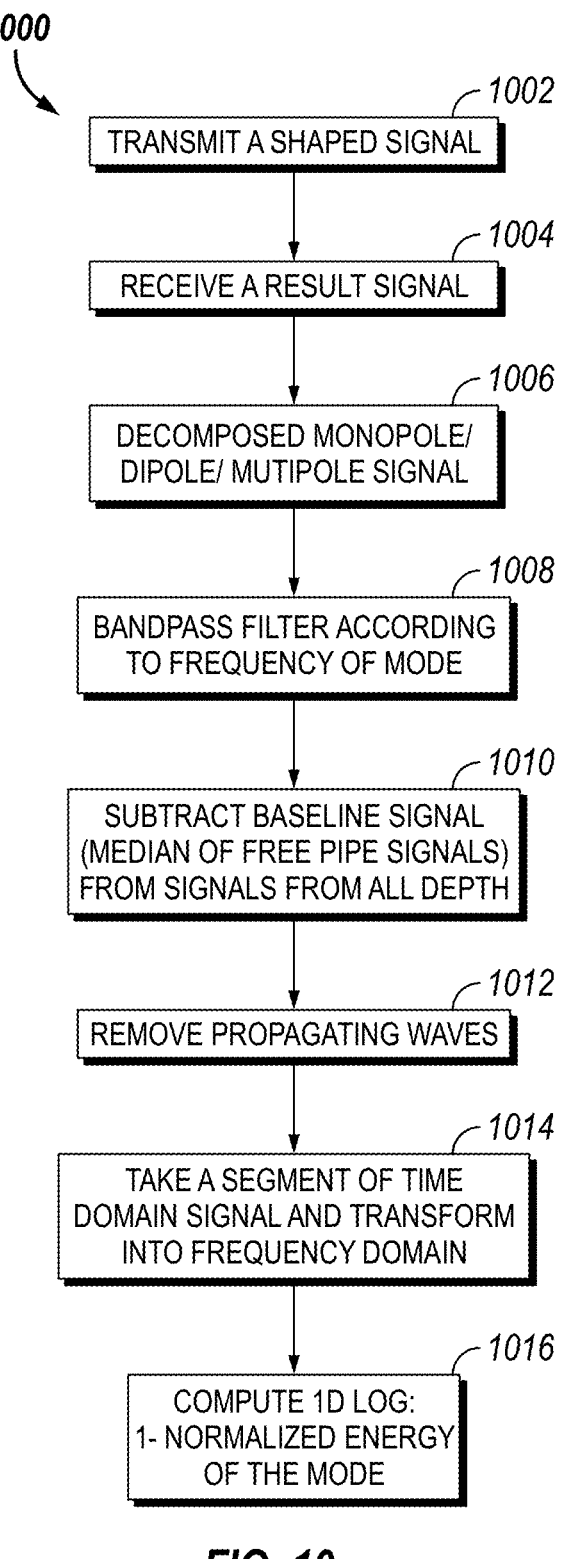

_1000_

1002
TRANSMIT A SHAPED SIGNAL

1004
RECEIVE A RESULT SIGNAL

1006
DECOMPOSED MONOPOLE/ DIPOLE/ MUTIPOLE SIGNAL

1008
BANDPASS FILTER ACCORDING TO FREQUENCY OF MODE

1010
SUBTRACT BASELINE SIGNAL (MEDIAN OF FREE PIPE SIGNALS) FROM SIGNALS FROM ALL DEPTH

1012
REMOVE PROPAGATING WAVES

1014
TAKE A SEGMENT OF TIME DOMAIN SIGNAL AND TRANSFORM INTO FREQUENCY DOMAIN

1016
COMPUTE 1D LOG: 1- NORMALIZED ENERGY OF THE MODE

_FIG. 10_

DIPOLE
16kHz MODE

Amplitude of
16kHz mode

DIPOLE
8kHz MODE

Amplitude of
8kHz mode

DIPOLE
5kHz MODE

Amplitude of
5kHz mode

FREQUENCY DOMAIN,
REMOVED FP AS BASELINE
5kHz DIPOLE

Frequency (kHz)

FB AS BASELINE
FP AS BASELINE

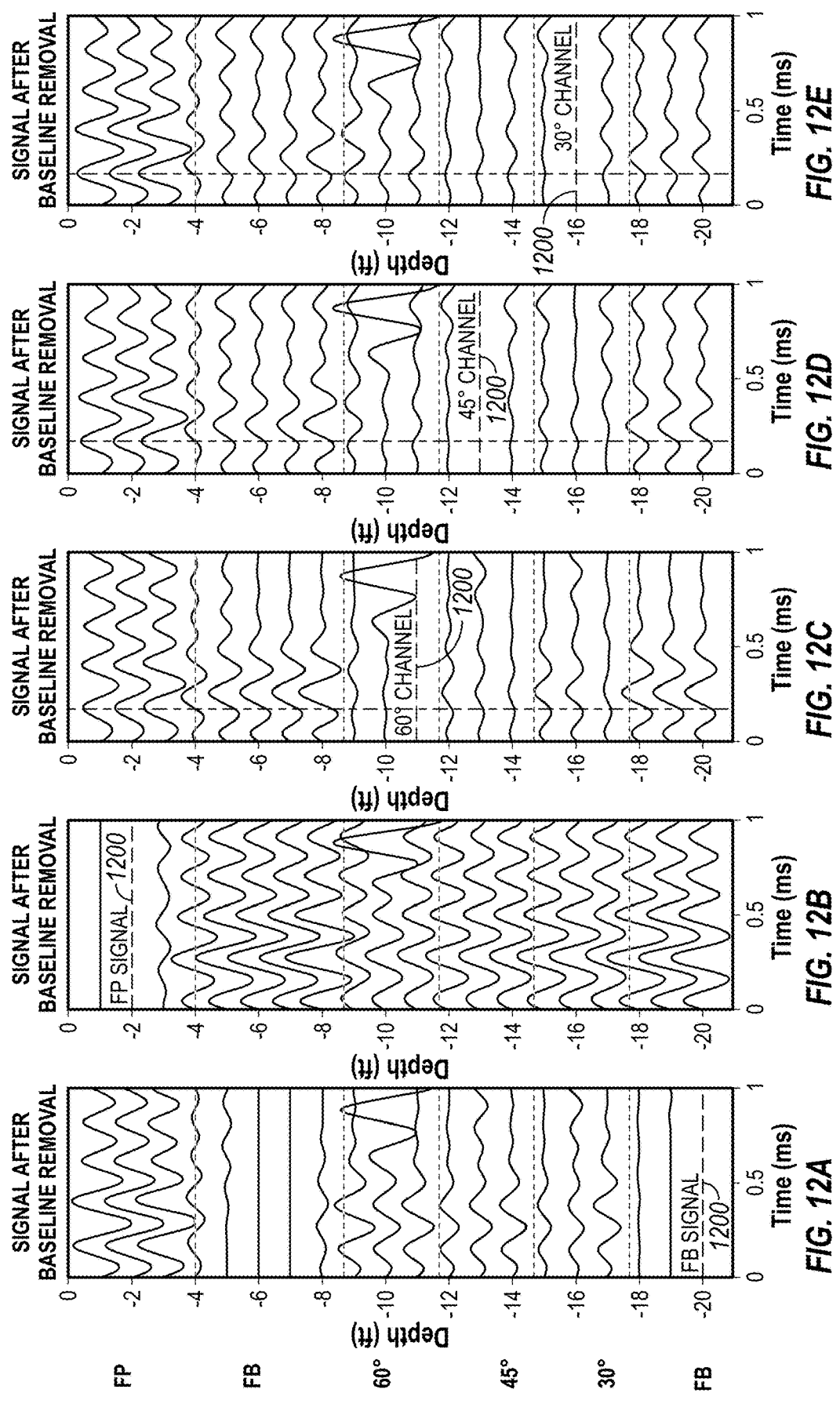

BASELINE SIGNAL FROM DEPTH 16ft (30° CHANNEL)

SIGNAL AFTER
BASELINE REMOVAL

FIG. 13E

PHASE AND MAGNITUDE

FIG. 13F

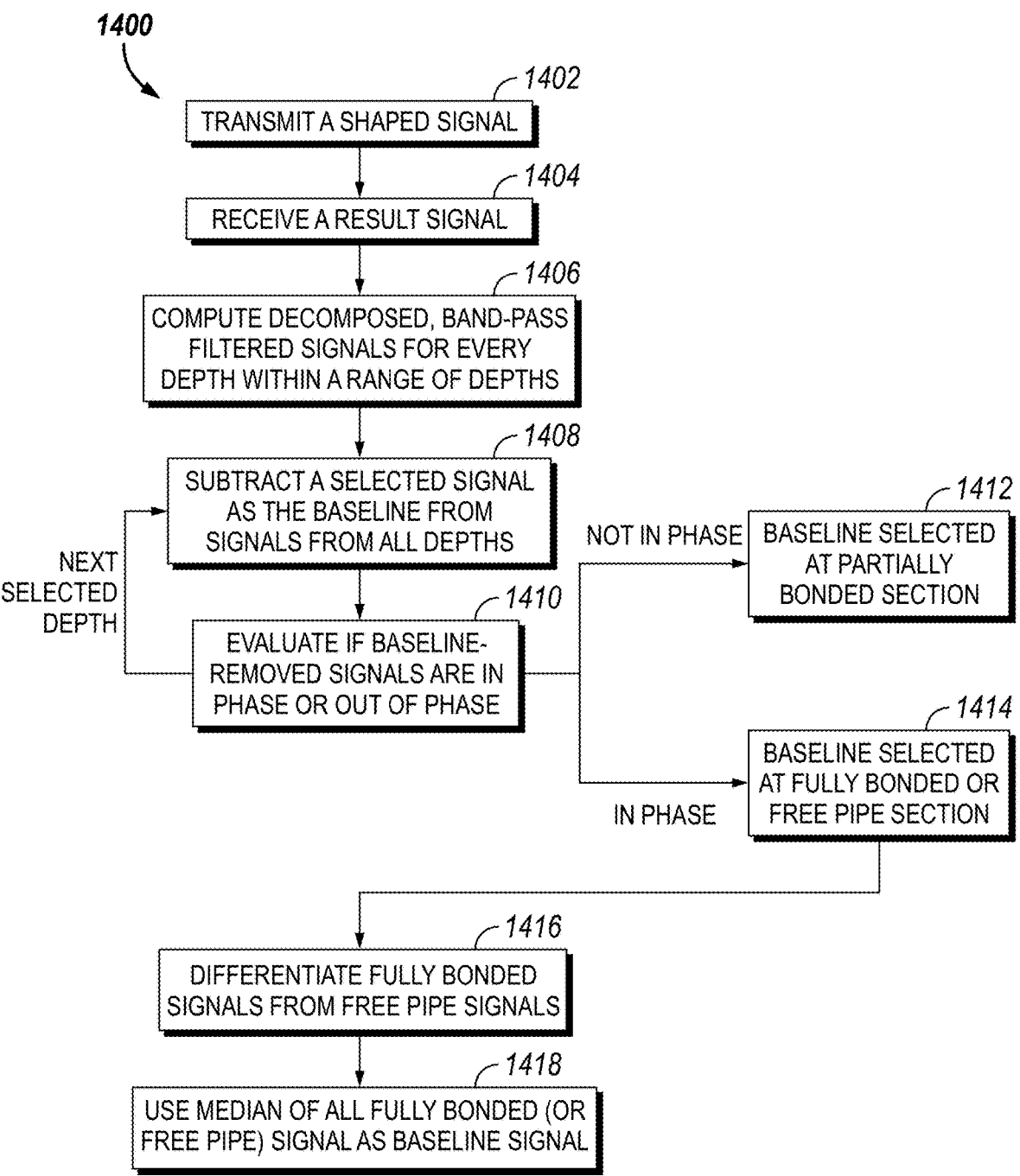

*1400*

*1402* TRANSMIT A SHAPED SIGNAL

*1404* RECEIVE A RESULT SIGNAL

*1406* COMPUTE DECOMPOSED, BAND-PASS FILTERED SIGNALS FOR EVERY DEPTH WITHIN A RANGE OF DEPTHS

*1408* SUBTRACT A SELECTED SIGNAL AS THE BASELINE FROM SIGNALS FROM ALL DEPTHS

NEXT SELECTED DEPTH

*1410* EVALUATE IF BASELINE-REMOVED SIGNALS ARE IN PHASE OR OUT OF PHASE

NOT IN PHASE

*1412* BASELINE SELECTED AT PARTIALLY BONDED SECTION

IN PHASE

*1414* BASELINE SELECTED AT FULLY BONDED OR FREE PIPE SECTION

*1416* DIFFERENTIATE FULLY BONDED SIGNALS FROM FREE PIPE SIGNALS

*1418* USE MEDIAN OF ALL FULLY BONDED (OR FREE PIPE) SIGNAL AS BASELINE SIGNAL

*FIG. 14*

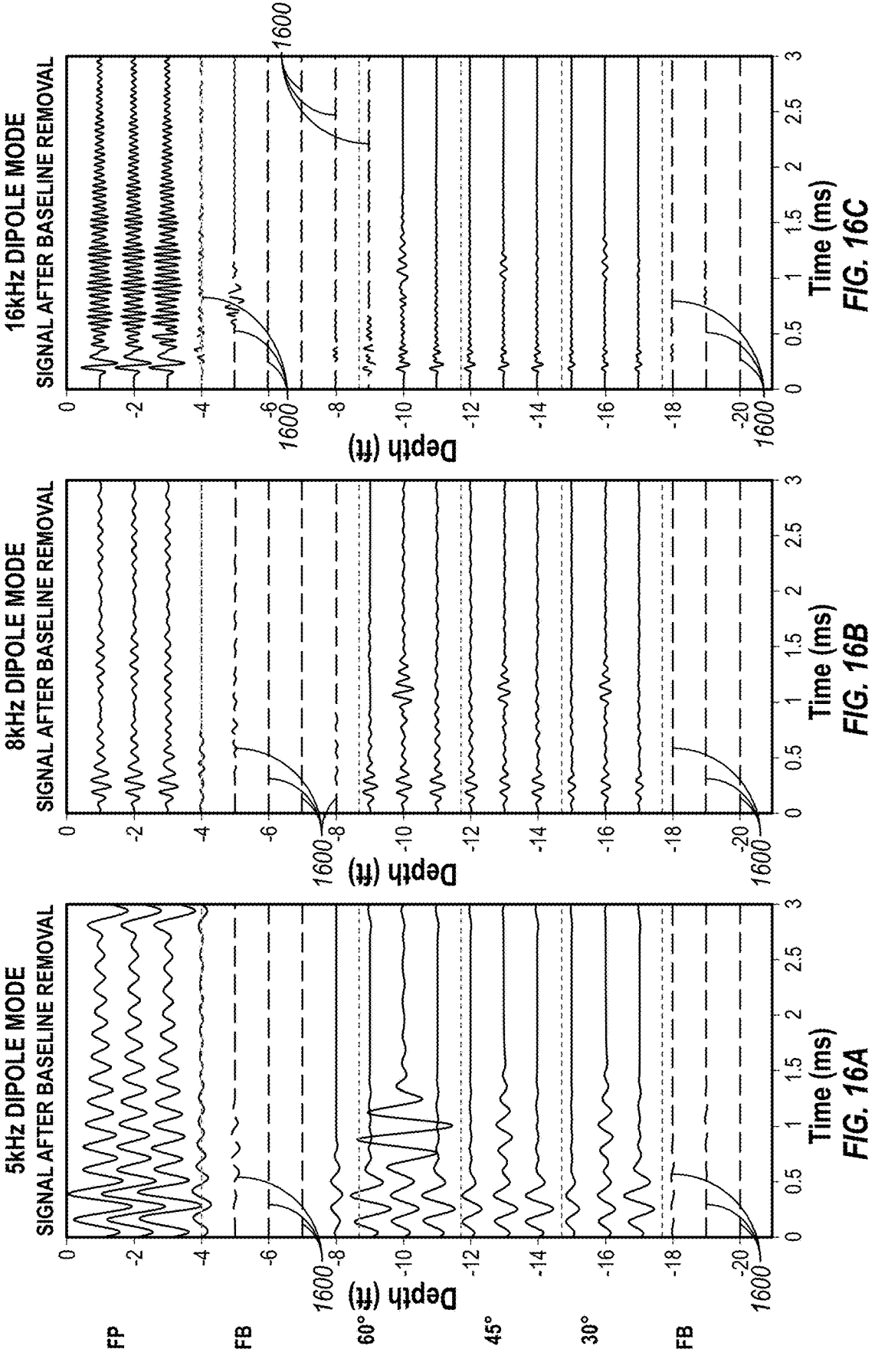

SELECTION AND REMOVAL OF ACOUSTIC BASELINE SIGNAL FOR ENHANCED CEMENT BOND EVALUATION

BACKGROUND

For oil and gas exploration and production, a network of wells, installations and other conduits may be established by connecting sections of metal pipe together. For example, a well installation may be completed, in part, by lowering multiple sections of metal pipe (i.e., a casing string) into a wellbore, and cementing the casing string in place. In some well installations, multiple casing strings are employed (e.g., a concentric multi-string arrangement) to allow for different operations related to well completion, production, or enhanced oil recovery (EOR) options.

At the end of a well installations' life, the well installation must be plugged and abandoned. Traditional cement bond log (CBL) tool requires the production tubing to be pulled out so that the signal can directly reach casing through borehole fluid. Understanding cement bond integrity to a pipe string and/or casing string may be beneficial in determining how to plug the well installation. Through tubing cement evaluation is challenging because traditional CBL tools do not have enough energy to penetrate the tubing. Additionally, the casing response may be too low to the overall signal received signal, which makes it difficult to evaluate the cement property behind the casing. There is a need to improve the signal to noise ratio using signal processing method and enhance the result of cement bond evaluation.

BRIEF DESCRIPTION OF THE DRAWINGS

These drawings illustrate certain aspects of some examples of the present disclosure and should not be used to limit or define the disclosure.

FIG. 10 illustrates a workflow for baseline removal from resonance mousing a free pipe waveform as the baseline signal;

FIGS. 12A-12E illustrate graphs of a random signal, that is not a resonance mode, that if chosen as a baseline signal and is subtracted from a result signal at any given depth;

FIGS. 13A-13F illustrate a dot product graph that indicates that the signal is out-of-phase from the reference signal;

FIG. 14 illustrates workflow for data-drive baseline selection;

FIGS. 16A-16C illustrate graphs in which data-driven baseline selection from the workflow for data-drive baseline selection is applied to simulation signals of a test well with different bonding conditions.

DETAILED DESCRIPTION

This disclosure may generally relate to methods for identifying cement bonding as well as materials behind a casing with an acoustic logging tool. Acoustic sensing may provide continuous in situ measurements of parameters related to cement bonding to a casing. As a result, acoustic sensing may be used in cased borehole monitoring applications. As disclosed herein, acoustic logging tools may be used to emit an acoustic signal which may traverse through a pipe string to a casing. Reflected signals that are measured by the acoustic logging tool as result signals, which may be analyzed to determine if casing is fully bonded, if the casing is free pipe, or if the waveforms are from partially bonded section. The proposed method subtracts a baseline signal (such as the fully bonded signal) from the results signals at any depth of investigation. This increases the signal to noise ratio and enhances the result of cement bonding evaluation. Additionally, a data-driven baseline removal workflow may remove unwanted signals without the need of prior knowledge of bonding information. By identifying fully bonded pipe, free pipe, or partially bonded pipe within a bonding log, an operator may be able to identify and determine a location within a wellbore for plugging the wellbore during an abandonment operation.

Figure 1:
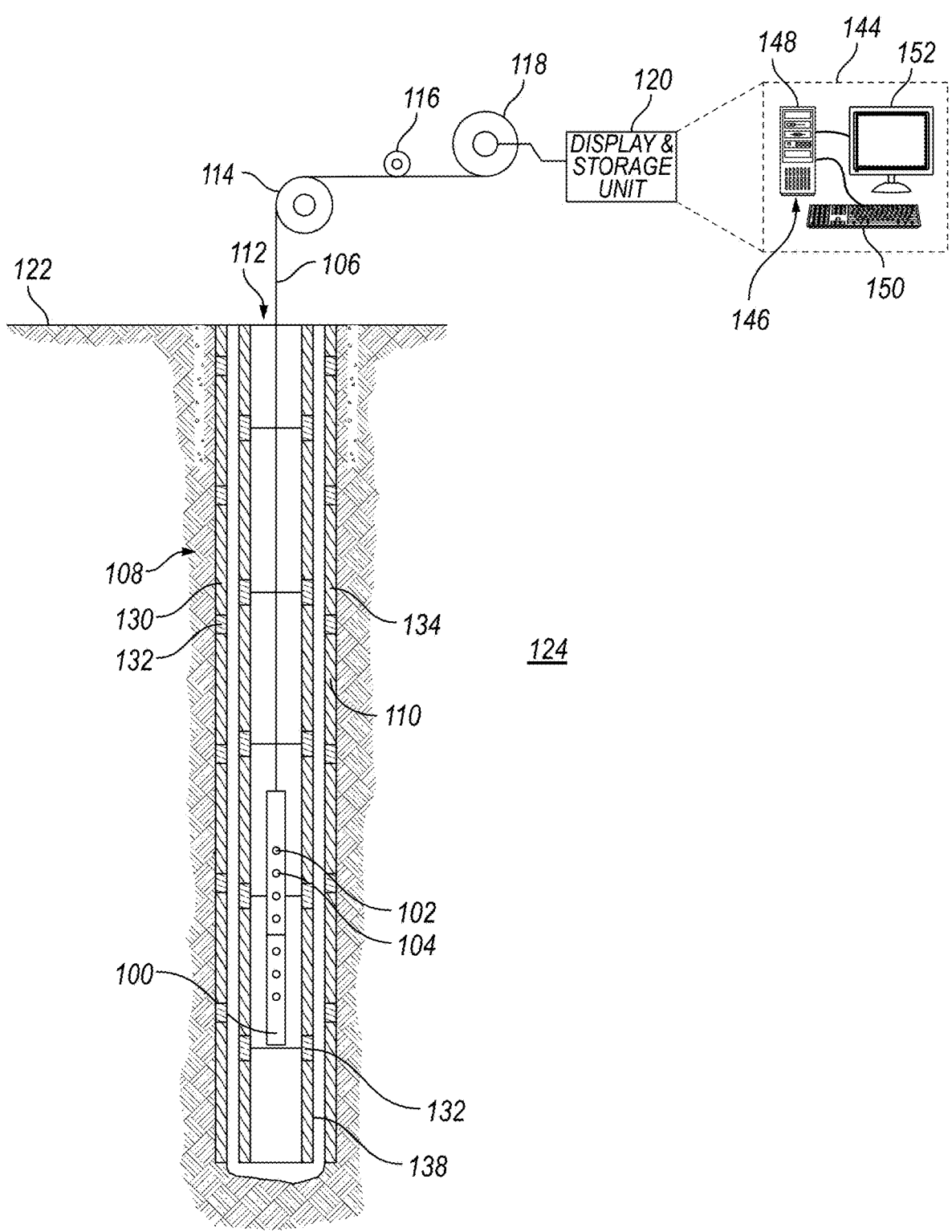
FIG. 1 illustrates a system including an acoustic logging tool.

FIG. 1 illustrates an operating environment for an acoustic logging tool 100 as disclosed herein. Acoustic logging tool 100 may comprise a transmitter 102 and/or a receiver 104. In examples, there may be any number of transmitters 102 and/or any number of receivers 104, which may be disposed on acoustic logging tool 100. Acoustic logging tool 100 may be operatively coupled to a conveyance 106 (e.g., wireline, slickline, coiled tubing, pipe, downhole tractor, and/or the like) which may provide mechanical suspension, as well as electrical connectivity, for acoustic logging tool 100. Conveyance 106 and acoustic logging tool 100 may extend within casing string 108 to a desired depth within the wellbore 110. Conveyance 106, which may include one or more electrical conductors, may exit wellhead 112, may pass around pulley 114, may engage odometer 116, and may be reeled onto winch 118, which may be employed to raise and lower the tool assembly in the wellbore 110. Signals recorded by acoustic logging tool 100 may be stored on memory and then processed by display and storage unit 120 after recovery of acoustic logging tool 100 from wellbore 110. Alternatively, signals recorded by acoustic logging tool 100 may be conducted to display and storage unit 120 by way of conveyance 106. Display and storage unit 120 may process the signals, and the information contained therein may be displayed for an operator to observe and stored for future processing and reference. Alternatively, signals may be processed downhole prior to receipt by display and storage unit 120 or both downhole and at surface 122, for example, by display and storage unit 120. Display and storage unit 120 may also contain an apparatus for supplying control signals and power to acoustic logging tool 100. Typical casing string 108 may extend from wellhead 112 at or above ground level to a selected depth within a wellbore 110. Casing string 108 may comprise a plurality of joints 130 or segments of casing string 108, each joint 130 being connected to the adjacent segments by a collar 132.

FIG. 1 also illustrates a typical pipe string 138, which may be positioned inside of casing string 108 extending part of the distance down wellbore 110. Pipe string 138 may be production tubing, tubing string, casing string, or other pipe disposed within casing string 108. Pipe string 138 may comprise concentric pipes. It should be noted that concentric pipes may be connected by collars 132. Acoustic logging tool 100 may be dimensioned so that it may be lowered into the wellbore 110 through pipe string 138, thus avoiding the difficulty and expense associated with pulling pipe string 138 out of wellbore 110.

In logging systems, such as, for example, logging systems utilizing the acoustic logging tool 100, a digital telemetry system may be employed, wherein an electrical circuit may be used to both supply power to acoustic logging tool 100 and to transfer data between display and storage unit 120 and acoustic logging tool 100. A DC voltage may be provided to acoustic logging tool 100 by a power supply located above ground level, and data may be coupled to the DC power conductor by a baseband current pulse system. Alternatively, acoustic logging tool 100 may be powered by batteries located within the downhole tool assembly, and/or the data provided by acoustic logging tool 100 may be stored within the downhole tool assembly, rather than transmitted to the surface during logging (corrosion detection).

Acoustic logging tool 100 may be used for excitation of transmitter 102. As illustrated, one or more receiver 104 may be positioned on the acoustic logging tool 100 at selected distances (e.g., axial spacing) away from transmitter 102. The axial spacing of receiver 104 from transmitter 102 may vary, for example, from about 0 inches (0 cm) to about 40 inches (101.6 cm) or more. In some embodiments, at least one receiver 104 may be placed near the transmitter 102 (e.g., within at least 1 inch (2.5 cm) while one or more additional receivers may be spaced from 1 foot (30.5 cm) to about 5 feet (152 cm) or more from the transmitter 102. It should be understood that the configuration of acoustic logging tool 100 shown on FIG. 1 is merely illustrative and other configurations of acoustic logging tool 100 may be used with the present techniques. In addition, acoustic logging tool 100 may include more than one transmitter 102 and more than one receiver 104. For example, an array of receivers 104 may be used. Transmitters 102 may include any suitable acoustic source for generating acoustic waves downhole, including, but not limited to, monopole and multipole sources (e.g., dipole, cross-dipole, quadrupole, hexapole, or higher order multi-pole transmitters). Additionally, one or more transmitters 102 (which may include segmented transmitters) may be combined to excite a mode corresponding to an irregular/arbitrary mode shape. Specific examples of suitable transmitters 102 may include, but are not limited to, piezoelectric elements, bender bars, or other transducers suitable for generating acoustic waves downhole. Receiver 104 may include any suitable acoustic receiver suitable for use downhole, including piezoelectric elements that may convert acoustic waves into an electric signal.

Figure 2:
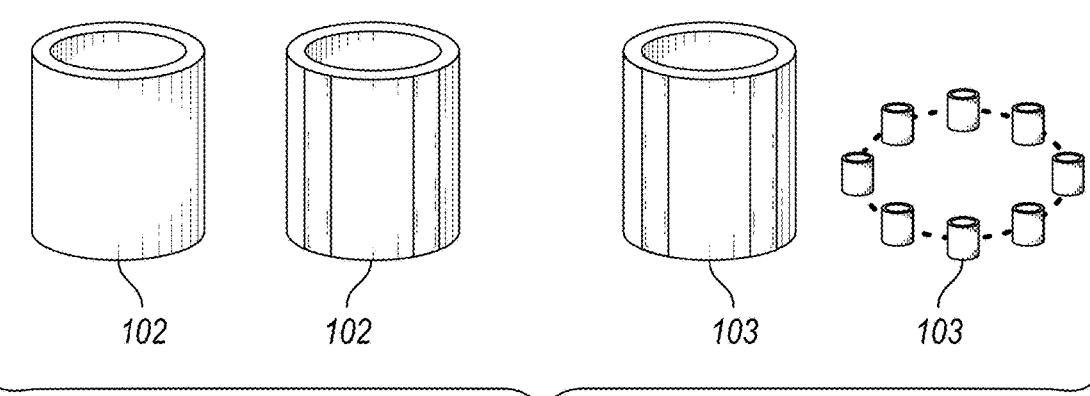
FIG. 2 illustrates an example of a transmitter and a receiver.

FIG. 2 illustrates examples of transmitter 102 and receiver 104. As discussed above, transmitters 102 (as well as receivers 104) may be a monopole or include multipole sources (e.g., dipole, cross-dipole, quadrupole, hexapole, or higher order multi-pole transmitters). Additionally, one or more transmitters 102 (which may include segmented transmitters) may be combined to excite a mode corresponding to an irregular/arbitrary mode shape. For example, transmitter 102 may be cylindrical and/or segmented piezoelectric tube. Additionally, transmitter 103 may be a monopole, a dipole, a quadrupole and/or a higher order transmitter. Receivers 104 may include a segmented piezoelectric tube, individual receiver, or azimuthal receivers, which may produce azimuthal variation of bonding behind casing 134. It should be noted that transmitter 102 and receiver 104 may be combined into a single element with the ability to both transmit acoustic waves and receiver acoustic waves, which may be identified as a transceiver.

Referring back to FIG. 1, transmission of acoustic waves by the transmitter 102 and the recordation of signals by receivers 104 may be controlled by display and storage unit 120, which may include an information handling system 144. As illustrated, the information handling system 144 may be a component of the display and storage unit 120. Alternatively, the information handling system 144 may be a component of acoustic logging tool 100. An information handling system 144 may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, an information handling system 144 may be a personal computer, a network storage device, or any other suitable device and may vary in size, shape, performance, functionality, and price. Information handling system 144 may include a processing unit 146 (e.g., microprocessor, central processing unit, etc.) that may process EM log data by executing software or instructions obtained from a local non-transitory computer readable media 148 (e.g., optical disks, magnetic disks). The non-transitory computer readable media 148 may store software or instructions of the methods described herein. Non-transitory computer readable media 148 may include any instrumentality or aggregation of instrumentalities that may retain data and/or instructions for a period of time. Non-transitory computer readable media 148 may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing. Information handling system 144 may also include input device(s) 150 (e.g., keyboard, mouse, touchpad, etc.) and output device(s) 152 (e.g., monitor, printer, etc.). The input device(s) 150 and output device(s) 152 provide a user interface that enables an operator to interact with acoustic logging tool 100 and/or software executed by processing unit 146. For example, information handling system 144 may enable an operator to select analysis options, view collected log data, view analysis results, and/or perform other tasks.

Figure 3:
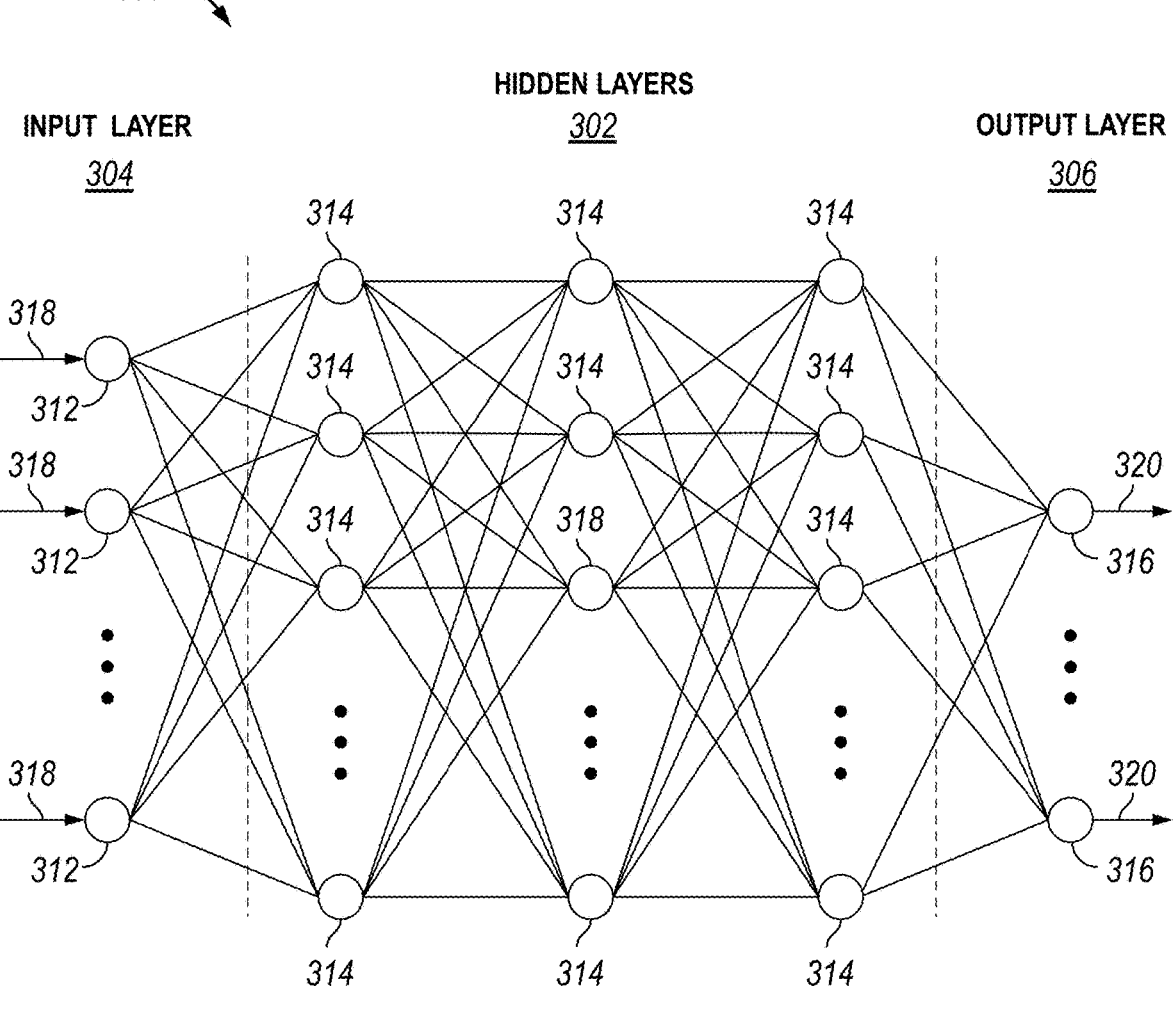
FIG. 3 illustrates a schematic of a neural network.

As discussed above, data measurements are processed using information handling system 144 (e.g., referring to FIG. 1) and, in examples, in conjunction with machine learning. There are many different types of machine learning models. For example, machine learning may be any form of neural network (NN), Convolutional Neural Network (CNN), Recurrent Neural Network (RNN), Deep Learning Neural Network (DNN), rand forest network, AI training, pattern recognition, Support Vector Machine (SVM), and/or the like. FIG. 3 illustrates an example of a machine learning model, specifically, a (NN). It should be noted that this is only an example, and many other forms of machine learning may be utilized. As illustrated in FIG. 3, a NN 300 is an artificial neural network with one or more hidden layers 302 between input layer 304 and output layer 306. In examples, NN 300 may be software on a single information handling system 144 (e.g., referring to FIG. 1). In other examples, NN 300 may software running on multiple information handling systems 144 connected wirelessly and/or by a hard-wired connection in a network of multiple information handling systems 144. As illustrated, input layer 304 may include measurement data 318 from acoustic logging tool 100 (e.g., referring to FIG. 1), and output layers 306 may be answer products 320 from the processing discussed above. During operations, measurement data 318 is given to neurons 312 in input layer 304. Neurons 312 are defined as individual or multiple information handling systems 144 connected in a network, which may compute the measurement data into graphs and/or figures using the processing techniques discussed above. The output from neurons 312 may be transferred to one or more neurons 314 within one or more hidden layers 302. Hidden layers 302 includes one or more neurons 314 connected in a network that further process information from neurons 312 according to processing techniques discussed above. The number of hidden layers 302 and neurons 312 in hidden layer 302 may be determined by an operator that designs NN 300. Hidden layers 302 is defined as a set of information handling system 144 assigned to specific processing steps identified above. Hidden layers 302 spread computation to multiple neurons 312, which may allow for faster computing, processing, training, and learning by NN 300.

Figure 4:
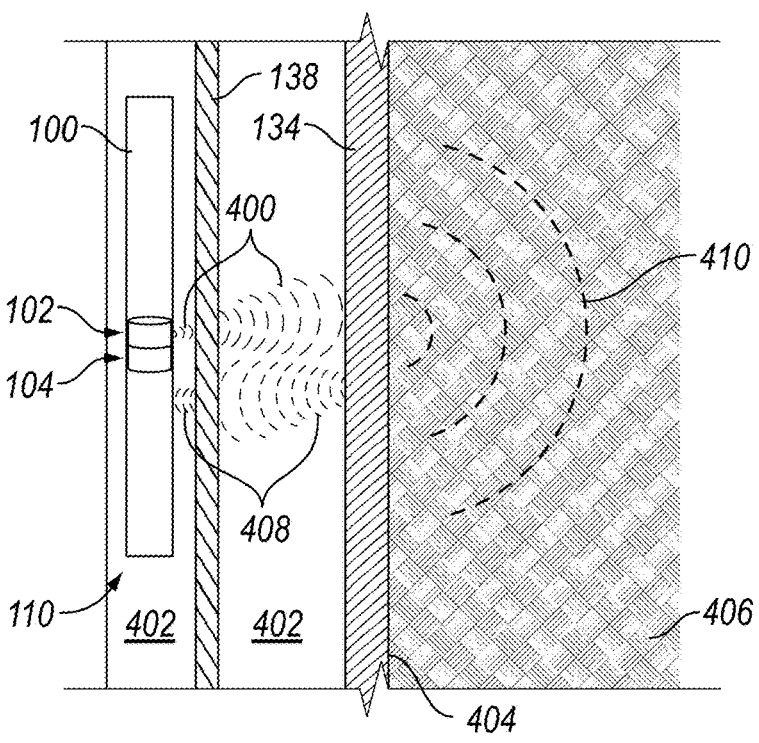
FIG. 4 illustrates the acoustic logging tool broadcasting a shaped signal.

FIG. 4 illustrates acoustic logging tool 100 disposed in wellbore 110, wherein transmitter 102 may broadcast a shaped signal 400 through pipe string 138, which may excite a fluid 402 that may be disposed between pipe string 138 and casing 134. Shaped signal 400 may be transmitted at 1 to 100 kHz. It should be noted that fluid 402 may comprise "mud" disposed downhole for drilling operations. Additionally, fluid 402 may be disposed within pipe string 138. Thus, fluid 402 may be within pipes string 138 and be disposed between pipiest ring 138 and casing 134. Shaped signal 400 may lose energy as it passes through pipe string 138, however, shaped signal 400 may continue to resonate through fluid 402 to casing 134. At casing 134, shaped signal 400 may interact with boundary 404 that is casing 134 and material 406. Material 406 may be cement, water, air, and/or any combination thereof. The interaction at boundary 404 may cause result signal 408 and dissipated signal 410. Result signal 408 may be reflected off of boundary 404 back to acoustic logging tool 100. In examples, result signal 408 comprises reflections, refractions, and/or a resonance which is formed in late time.

As illustrated in FIG. 4, result signal 408 may interact with pipe string 138, pass through pipe string 138, and be sense, recorded, and/or measured by receiver 104. Result signal 408 may be between 1 to 100 kHz. Dissipated signal 410 may continue to move through material 406, which may continuously capture energy from dissipated signal 410 until dissipated signal 410 is extinguished. Result signal 408 may be processed to further determine if material 406 (i.e., cement, water, air, and/or the like) may be bonded to casing 134.

Figure 5:
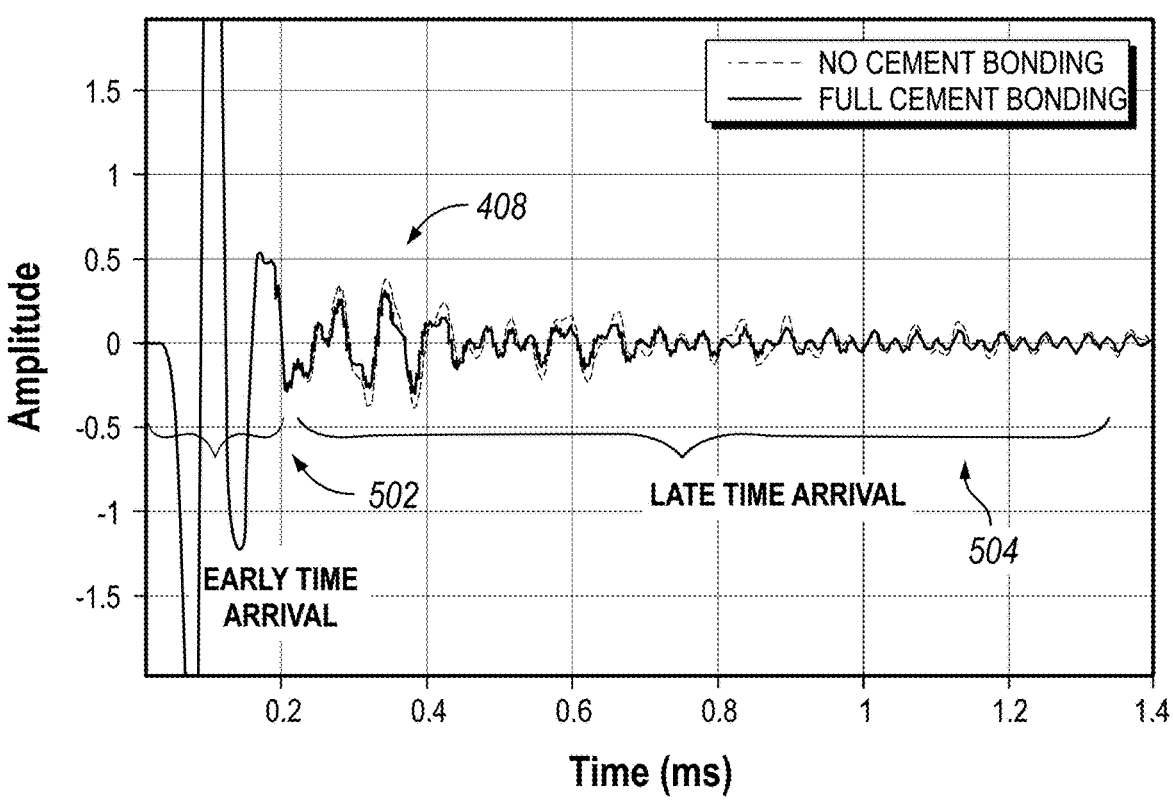
FIG. 5 is a graph of a time domain signal from a single receiver for two cement bonding conditions.

For example, FIG. 5 illustrates a graph of one or more result signals 408, which was captured by receiver 104 (e.g., referring to FIG. 4). As illustrated, early time arrivals 502 contains a bulk of acoustic energy, which include reflection from pipe string 138, reflection from casing 134 through pipe string 138, guided wave refraction from pipe string 138, guided-wave refraction from casing 134 through pipe string 138 (e.g., referring to FIG. 4), Stoneley wave, tool wave, and/or the like. After a certain time, certain waves propagate away from receiver 104 in the form of guided casing wave, guided tubing wave, tool wave, Stoneley wave or multiple reflections (e.g., not illustrated and represented by dissipated signal 410). Hence in late time arrivals 504, result signal 408 is observed to have fixed frequency components and with decreasing amplitude over time. This is considered as the borehole resonance mode. A mode may also be referred to as a waveform.

The resonance mode may be categorized into multipole responses. For example, a monopole transmitter (e.g., referring to FIG. 2) will generate monopole resonance modes. With borehole asymmetry, a monopole transmitter may also generate other multiple resonance modes, such as the dipole and quadrupole modes. Using an azimuthal receiver array will help to decompose the receiver response to monopole, dipole, unipole, quadrupole and higher order responses, or a response with any specific mode shape. Each resonance mode has a unique frequency, mode shape and modal decay rate.

Figure 6:
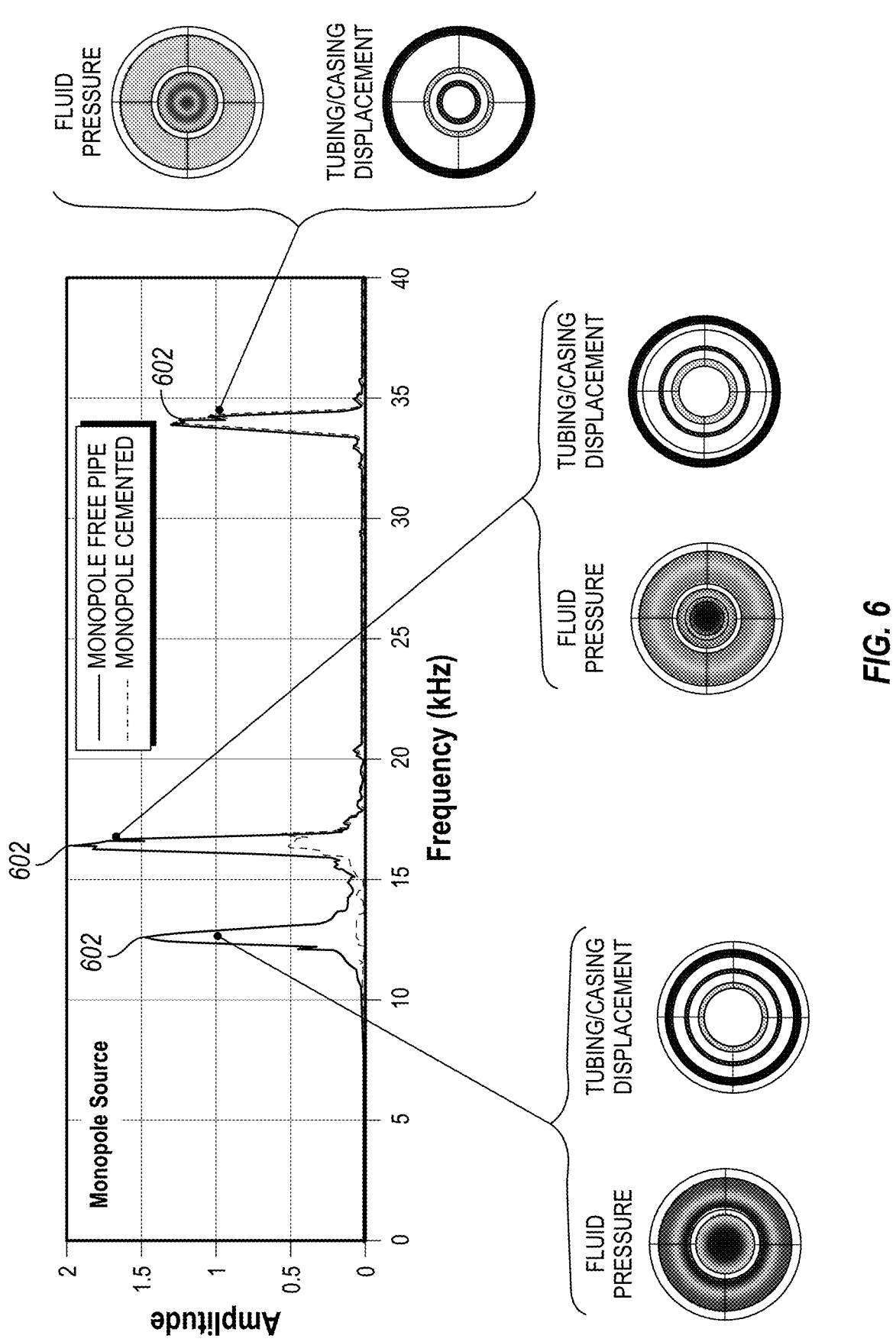
FIG. 6 is a graph of a decomposed monopole frequency domain response based on the late time arrival signals.

FIG. 6 illustrates an example of the decomposed monopole mode in the frequency domain generated from time-domain simulation. Three distinct resonance peaks 602 are observed. Comparing the response of free pipe (only fluid, no cement bond) and fully bonded casing 134 shows that not all resonance modes are sensitive to cement property. The first peak at 13 kHz is sensitive to cement bonding followed by the second peak at 16 kHz. The last peak at 34 kHz is least affected by cement bonding condition. Beside using time domain simulation result to determine cement-sensitive modes (as shown in FIG. 6 by comparing two frequency spectrum curves), the sensitivity to cement bonding may also be determined by performing a modal analysis to get the mode shape of each resonance modes. The mode shape of both fluid pressure and tubing/casing displacement is also shown in FIG. 6. It is observed that the first mode and second mode have comparable amount of acoustic energy in pipe string 138 as well as in the annulus. Casing 134 also shows displacement although it is smaller than displacement of pipe string 138. Displacement of casing 134 may create a leaky wave in material 406 behind casing 134. In examples, having a material 406 of higher acoustic impedance (cement, for example) will generate more attenuation to this borehole resonance mode. Hence the first two resonance modes are sensitive to cement bonding. The resonance modes may be utilized to further increase signal-to-noise ratio (SNR), which may be used to identify at what depths casing 134 may be bonded or may be free pipe within wellbore 110.

Figures 7A, 7B, 7C:
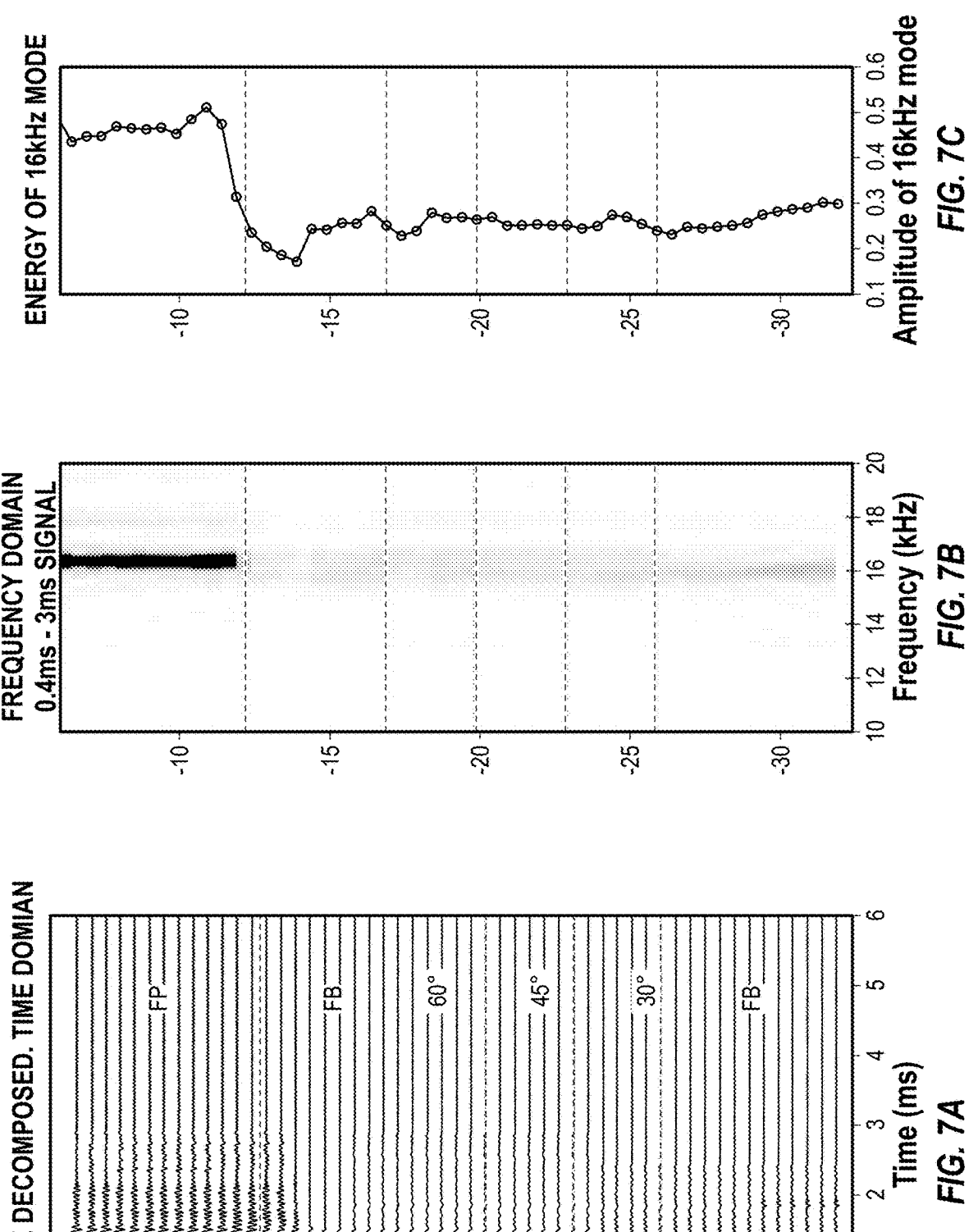
FIGS. 7A-7C are graphs that illustrate a workflow for processing resonance modes into a 1D bonding log.

FIGS. 7A-7C illustrate resonance modes captured and recorded by acoustic logging tool 100 that may be processed utilizing information handling system 144 into a 1D bonding log. As noted above, utilizing information handling system 144, this generally is performed by taking a segment of a time domain signal, transforming the time domain signal into a frequency domain, and taking the amplitude of selected mode at a range of frequency to form a 1D cement bond log. However, resonance modes, while helpful, may not fully differentiate between fully bonded depths from partially bonded depths, which may lead to misleading 1D bond logs.

As noted above, resonance modes comprise other signals beside a resonance signal, such as reflected waves, refracted waves, guided waves through tubing and casing, and/or fluid modes. These waves may have a higher amplitude compared to the difference in resonance waves between fully bonded and partially-bonded signals. However, identifying a baseline signal of the resonance modes may allow for removal of the baseline signal from the resonance modes, which may allow for the differentiation of fully bonded section from a partially bonded section. This may improve signal to noise ratio and enhance the result of cement bond evaluation.

Figure 8:
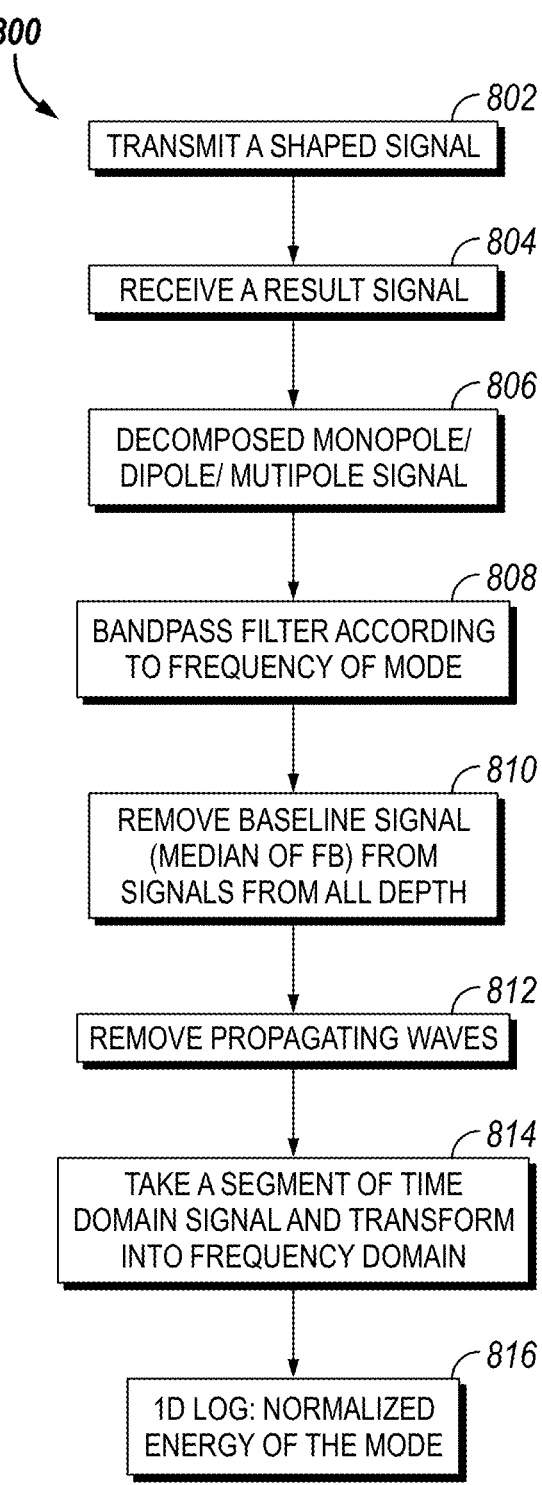
FIG. 8 illustrates a workflow for baseline removal from resonance modes.

FIG. 8 illustrates workflow 800 for baseline removal from resonance modes. It should be noted that workflow 800 may be performed, at least in part, on information handling system 144. Workflow 800 may begin with block 802 in which transmitter 102, disposed on acoustic logging tool 100 disposed in wellbore 110, emits a shaped signal 400 (i.e., an acoustic signal) which interacts with wellbore 110 (e.g., referring to FIG. 4). A result signal 408 may be received by one or more receivers 104 (i.e., azimuthal receivers) (e.g., referring to FIG. 4) in block 804. In block 806, result signals 408 may be decomposed to monopole, dipole or higher order multipoles depending on the order of a resonance mode. The order of multipole to be decomposed may be determined by identifying which resonance mode may be sensitive to cement bonding, as described above. Additionally, in block 806 a log is created for the decomposing of the results signals 408 for every depth that acoustic measurements were taken. In block 808, a bandpass filter is applied on the decomposed time domain signal, for every depth within the log, according to the frequency of the resonance mode which is determined to be sensitive to cement bonding. Applying the bandpass filter forms a filtered signal for every depth within the log.

In block 810 a baseline signal is subtracted from the filtered signal for any given depth or range of depths within the log. The baseline signal is computed as a median of filtered signals from fully bonded waveforms. In this example, the fully bonded waveforms are identified at any depth within the log in which a fully bonded casing 134 (e.g., referring to FIG. 6) is known. In block 812, propagating waves, due to reflections (as discussed above), may be removed from the filtered signals. Propagating waves may be removed utilizing processing methods such as, but not limited to, frequency-wavenumber filtering, slant-stack transform, the Radon transform, and/or the like. The filtered signal may then be examined at any depth by taking a segment of the time domain signal at any depth in the log and transforming the segment into frequency domain in block 814. In block 816, the energy of the identified cement-sensitive mode in the frequency domain is used to generate a 1D bonding log. The energy is calculated as the energy (area under curve) within a frequency range in the frequency domain. The frequency range is determined by the frequency of a known cement-sensitive mode. The amplitude of the log may be normalized so that amplitude at the free pipe section equals to one and amplitude at the fully bonded section equals to zero. Generally, when the baseline removal is performed, the fully bonded section will have zero amplitude. If a free pipe section exists in the depth range, the entire 1D log may be normalized by the average amplitude of the log in the free pipe section. If a free pipe section does not exist in the depth range, the normalization factor may be determined from simulation or a pre-calculated library.

Figures 9A, 9B, 9C:
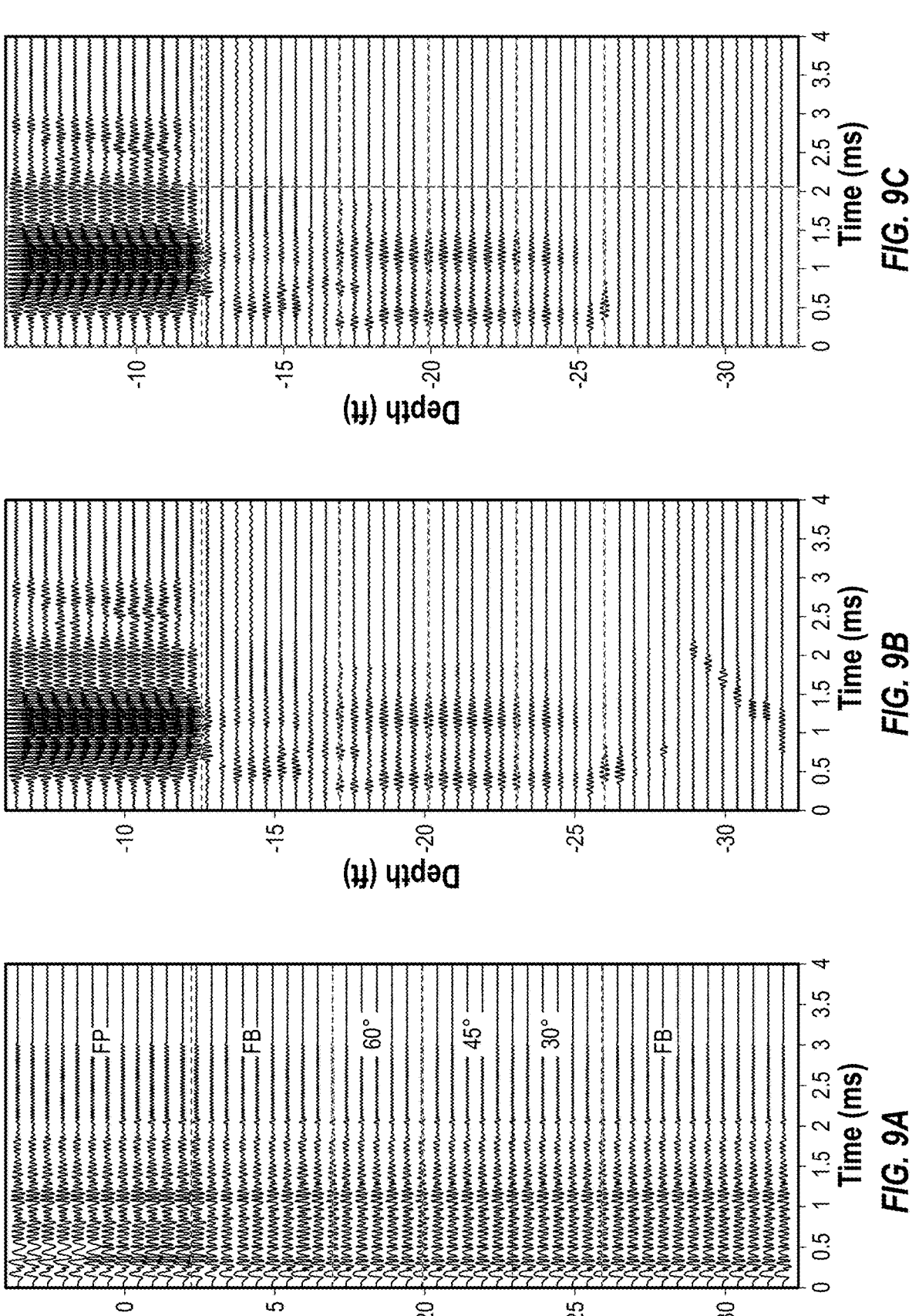
FIGS. 9A-9F illustrate graphs showing the workflow for baseline removal from resonance modes using a laboratory well.
Figure 9F:
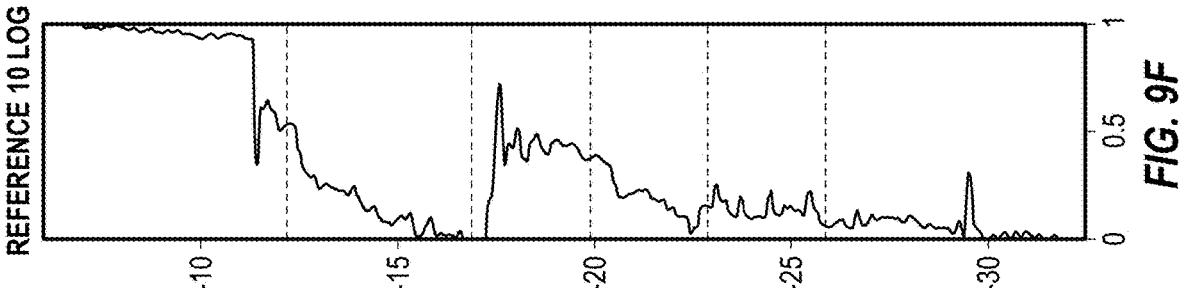
Figure 9E:
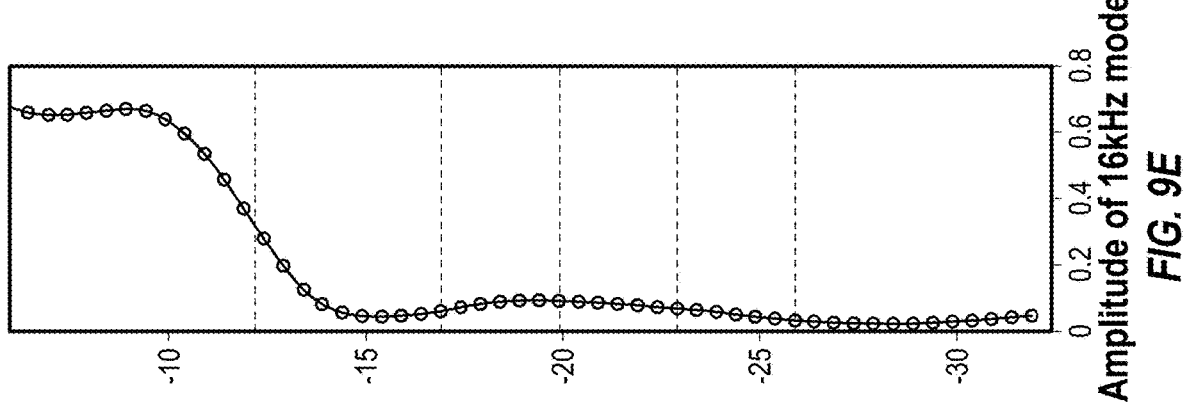
Figure 9D:
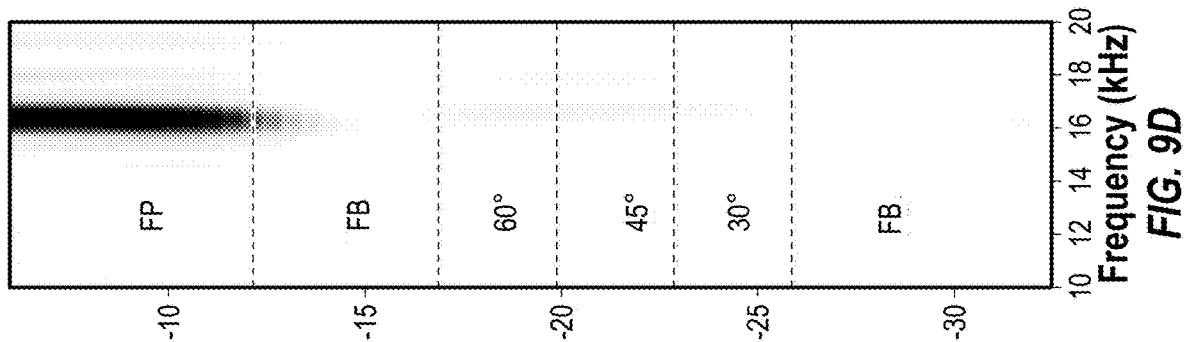
Figures 11A, 11B, 11C, 11D:
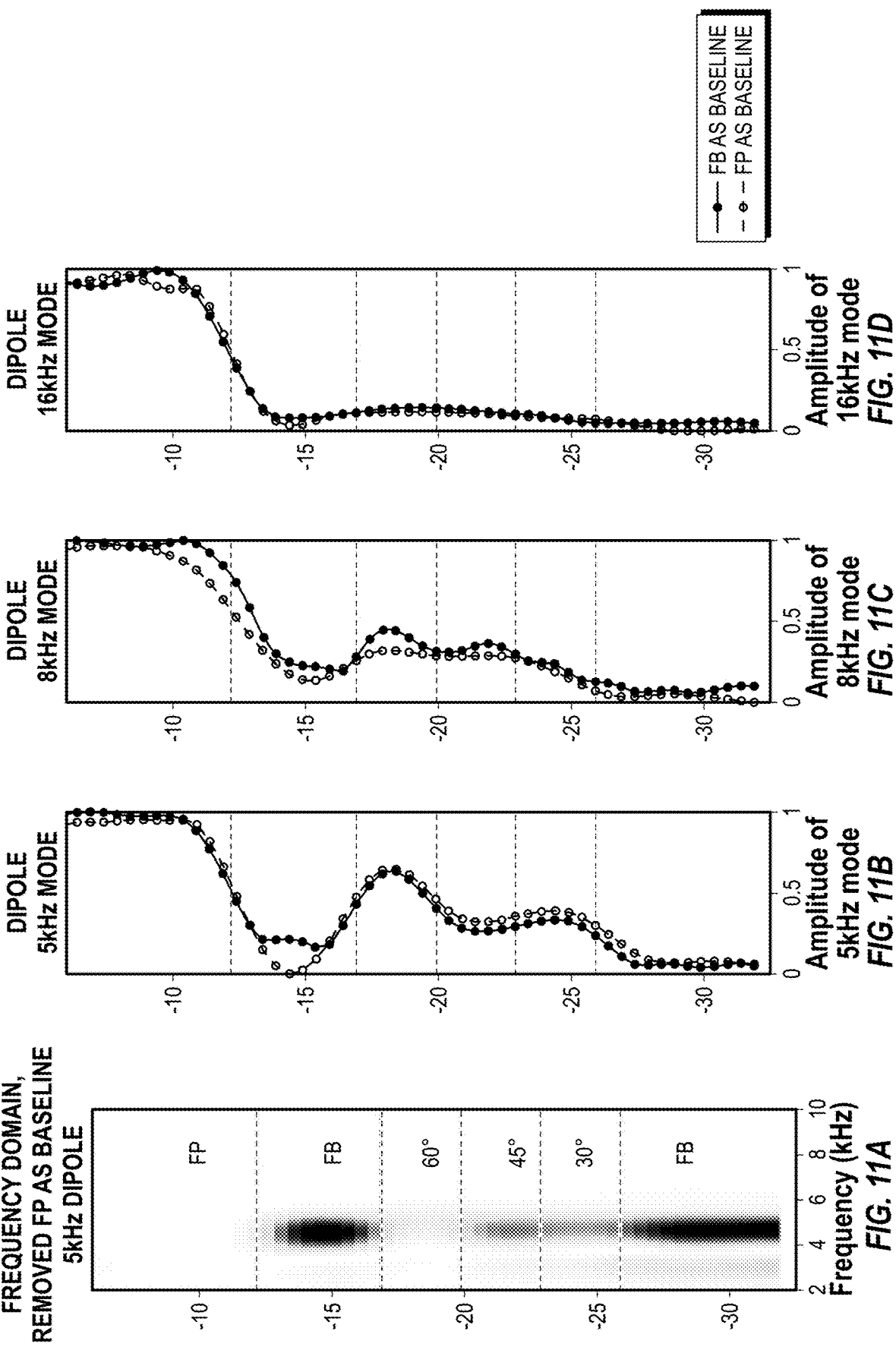
FIGS. 11A-11D illustrate graphs comparing the results between using a fully bonded waveform or a free pipe waveform.

FIGS. 9A-9F illustrate the application of workflow 800 to a laboratory well. The raw data (FIG. 9A) is the same as the one shown in FIG. 7A. The data is collected from a laboratory well with different bonding conditions. In this example, pipe string 138 is decentered in casing 134 (e.g., referring to FIGS. 1 and 4). FIG. 9B shows a filtered signal after applying a bandpass filter and removal of fully bonded baseline signal. As illustrated in FIG. 9B, propagating waves may be seen at and/or near 30 ft. The propagating waves may be removed by frequency-wavenumber filter as shown in FIG. 9C. The frequency domain signal is shown in FIG. 9D showing the resonance mode at 16 kHz. The amplitude of the mode is shown as a 1D log in FIG. 9F. The processed 1D log matches a reference 1D log shown in FIG. 9G, which may be acquired using an ultrasonic cement evaluation tool, on the same well without pipe string 138. Thus, the processing of workflow 800 is reliable.

As discussed above, workflow 800 takes the median of fully bonded signals, in which the depth location of fully bonded section is known through prior knowledge. In practical situation, the fully bonded depth is usually unknown. However, free pipe depth is usually known, which may be found utilizing the methods disclosed above.

In FIG. 10, workflow 1000 may utilize a free pipe waveform as the baseline signal. It should be noted that workflow 1000 may be performed, at least in part, on information handling system 144. Workflow 1000 may begin with block 1002 in which transmitter 102, disposed on acoustic logging tool 100 disposed in wellbore 110, emits a shaped signal 400 (i.e., an acoustic signal) which interacts with wellbore 110 (e.g., referring to FIG. 4). A result signal 408 may be received by one or more receivers 104 (i.e., azimuthal receivers) (e.g., referring to FIG. 4) in block 1004. In block 1006, result signals 408 may be decomposed to monopole, dipole or higher order multipoles depending on the order of a resonance mode. The order of multipole to be decomposed may be determined by identifying which resonance mode may be sensitive to cement bonding, as described above. Additionally, in block 1006 a log is created for the decomposing of the results signals 408 for every depth that acoustic measurements were taken. In block 1008, a bandpass filter is applied on the decomposed time domain signal, for every depth within the log, according to the frequency of the resonance mode which is determined to be sensitive to cement bonding. Applying the bandpass filter forms a filtered signal for every depth within the log.

In block 1010 a baseline signal is subtracted from the filtered signal for any given depth or range of depths within the log. The baseline signal is computed as a median of filtered signals from free pipe waveforms. In this example, the free pipe waveforms are identified at any depth within the log in which free pipe is known. As discussed above, free pipe is pipe string 138 and/or casing 134 that are not cemented to each other or formation 124 (e.g., referring to FIG. 1). In block 1012, propagating waves, due to reflections (as discussed above), may be removed from the filtered signals. Propagating waves may be removed utilizing processing methods such as, but not limited to, frequency-wavenumber filtering, slant-stack transform, the Radon transform, and/or the like. The filtered signal may then be examined at any depth by taking a segment of the time domain signal at any depth in the log and transforming the segment into frequency domain in block 1014. In block 1016, the energy of the identified cement-sensitive mode in the frequency domain is used to generate a 1D bonding log. FIGS. 11A-11D illustrate graphs comparing the results between using a fully bonded waveform or a free pipe waveform. The graphs illustrate that using either free pipe signal or fully bonded signal may result in similar 1D log. Thus, the free pipe signal or fully bonded signal may be used interchangeably depending on which bonding information is available. The amplitude of the log may be normalized so that amplitude at the free pipe section equals to one and amplitude at the fully bonded section equals to zero. While workflows 800 and 1000 illustrate examples where prior knowledge is known of bonded sections and/or free pipe sections, there may be examples in which no prior knowledge is known regarding bonding or free pipe of casing 134 (e.g., referring to FIG. 1). Thus, when the bonding condition (i.e., fully bonded or free pipe) is unknown. Methods and systems may be utilized with a data-driven approach to identify a baseline signal for a fully bonded waveform or a free pipe waveform.

To determine a bonding condition without prior knowledge, an analyses of results signal 408 (e.g., referring to FIG. 4) may be performed. As noted above, result signals 408 may be separated into two parts. The first part is the resonance mode, which is sensitive to cement bonding condition. The second part is the direct arriving waves and guided waves which include Stoneley wave along the fluid, guided waves along pipe string 138 and casing 134 (e.g., referring to FIG. 1), reflected and refracted signals and tool waves. The second part may have similar amplitudes for different bonding conditions (e.g., fully bonded or free pipe). Thus, when a fully bonded signal is utilized as a baseline and subtract from a result signal 408 at a given depth, the second part of waves are removed, the remaining resonance mode gives us the bonding condition.

FIGS. 12A-12E are graphs that illustrate examples if a random signal, that is not a fully bonded or free pipe signal, is chosen as a baseline signal and is subtracted from a result signal 408 (e.g., referring to FIG. 4) at any given depth. For each graph in FIGS. 12A-12E, the time domain signals are plotted according to their depth on the X-axis and the bonding condition is labeled along the Y axis. From result signal 408 a waveform 1200 is chosen. As illustrated in the graphs of FIGS. 12A-12E, waveform 1200, which is chosen, zeroes itself out when subtracting it form result signal 408. In FIG. 12A, when the fully bonded signal is used as a baseline, the guided waves and direct arriving waves may generally be removed. The remaining signals may reflect resonance modes and are all in phase but with different amplitude. In FIG. 12B, when a free pipe signal is used as the baseline and removed from the result signal 408, the remaining signals are also in phase with each other. This is because the free pipe signal has the highest amplitude of resonance signal and resonance signal from other depths get over-subtracted. In FIGS. 12D and 12F, waveform 1200 is from a partially bonded section and is chosen as the baseline signal. The remaining signals at certain depths have resonance modes over-subtracted, showing the opposite phase. As a result, not all the signals are in phase. This indicates that an incorrect baseline is identified.

Thus, it may be determined if a correct baseline signal is selected based on whether the subtracted signals are in-phase or not in-phase. One way to identified that is to use a dot product between each signal and a reference signal, as illustrated in FIGS. 13A-13F. The dot produced is a sum of the products of the corresponding entries of the two sequences of numbers. Geometrically, it is the product of the Euclidean magnitudes of the two vectors and the cosine of the angle between them. The dot product in FIGS. 13A-13F is a calculation reflecting the measured signal at a selected depth and the measured baseline signal. A negative value indicates that the two signals are out-of-phase. A positive value indicates that the two signals are in-phase. Outside of a dot product, other analyses may be performed.

For example, computing delay in time domain or computing phase of resonance frequency in frequency domain may be utilized in place of a dot product graph. In the dot product graph, the reference signal is selected by identifying the waveform with the maximum root mean squared (RMS) amplitude. The reference signal is the signal closest to a free pipe signal. When baseline signal is selected at a partially bonded section (i.e., FIG. 13E), some signals may show the opposite phase from the reference signal. This is because signals from depth with smaller fluid channel (i.e., partially bonded) than the reference signal depth gets over-subtracted. The dot product at these depths will show negative values (i.e., FIG. 13F).

Figures 13A, 13B, 13C, 13D:
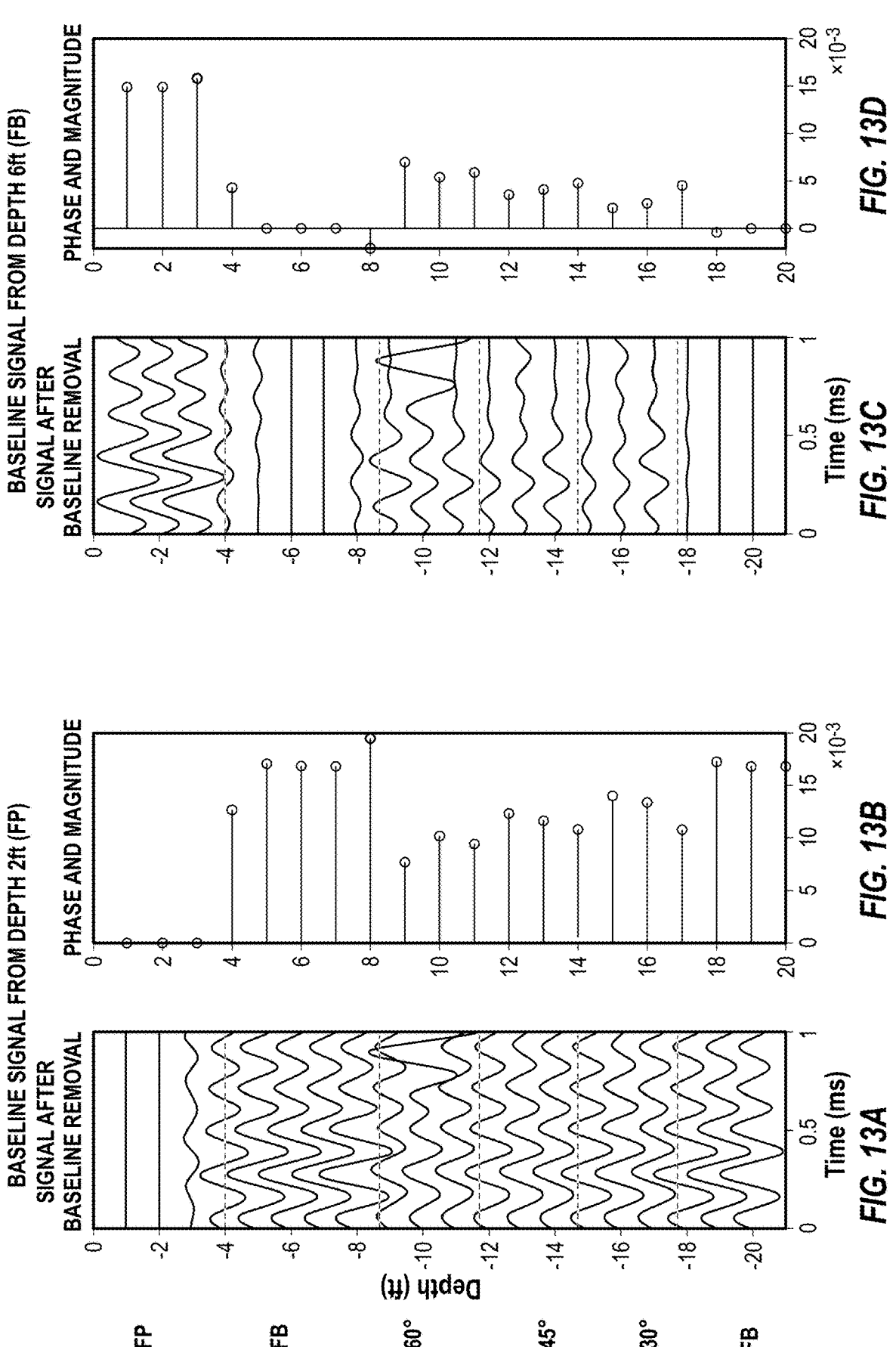
Figures 13E, 13F:
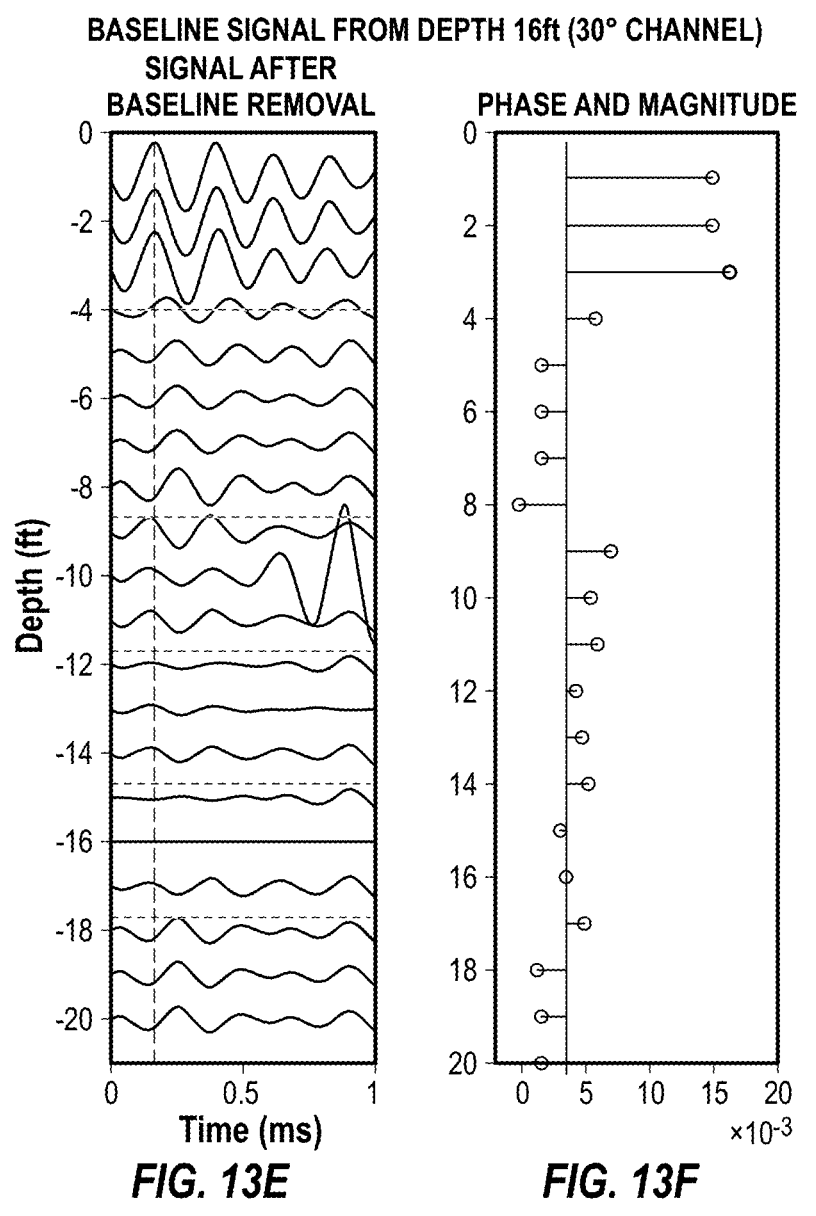

As noted above, remaining signals may have the same phase when the baseline signal is selected from the free pipe or fully bonded section. For examples, all signals in phase may be seen in (FIGS. 13A and 13C) and the dot product are all positive (FIGS. 13B and 13D). In a section where true fully bonded or free pipe section is not present, it will be the depths closest from the free pipe or fully bonded bonding condition.

FIG. 14 illustrates workflow 1400 for data-drive baseline selection. It should be noted that workflow 1400 may be performed, at least in part, on information handling system 144 (e.g., referring to FIG. 1). Workflow 1400 may begin with block 1402 in which transmitter 102, disposed on acoustic logging tool 100 disposed in wellbore 110, emits a shaped signal 400 (i.e., an acoustic signal, referring to FIG. 4) which interacts with wellbore 110 (e.g., referring to FIG. 4). A result signal 408 may be received by one or more receivers 104 (i.e., azimuthal receivers) (e.g., referring to FIG. 4) in block 1404. It should be noted that blocks 1402 and 1404 may be optional. Workflow 1400 may also begin with block 1406 if a log and/or log data is provided, which would not require a measurement operation to be performed. In block 1406 a bond log formed from measured and record acoustic signals using acoustic logging tool 100, as discussed above, is decomposed. In block 1406, band-pass filtered signals from the bond log may be decomposed. The decomposed signals in block 1406 are further processed in block 1408 by selected in a baseline signal. As noted above, a baseline signal is selected from any depth of the decomposed log and is subtracted from all depths within the decomposed log. In block 1410, the remaining signals are evaluated to determine if the remaining signals are in-phase. If they are in phase, the selected baseline signal is from a fully bonded or free pipe depth in block 1412. If not, the selected baseline signal is from a partially bonded section in block 1414.

Figure 15:
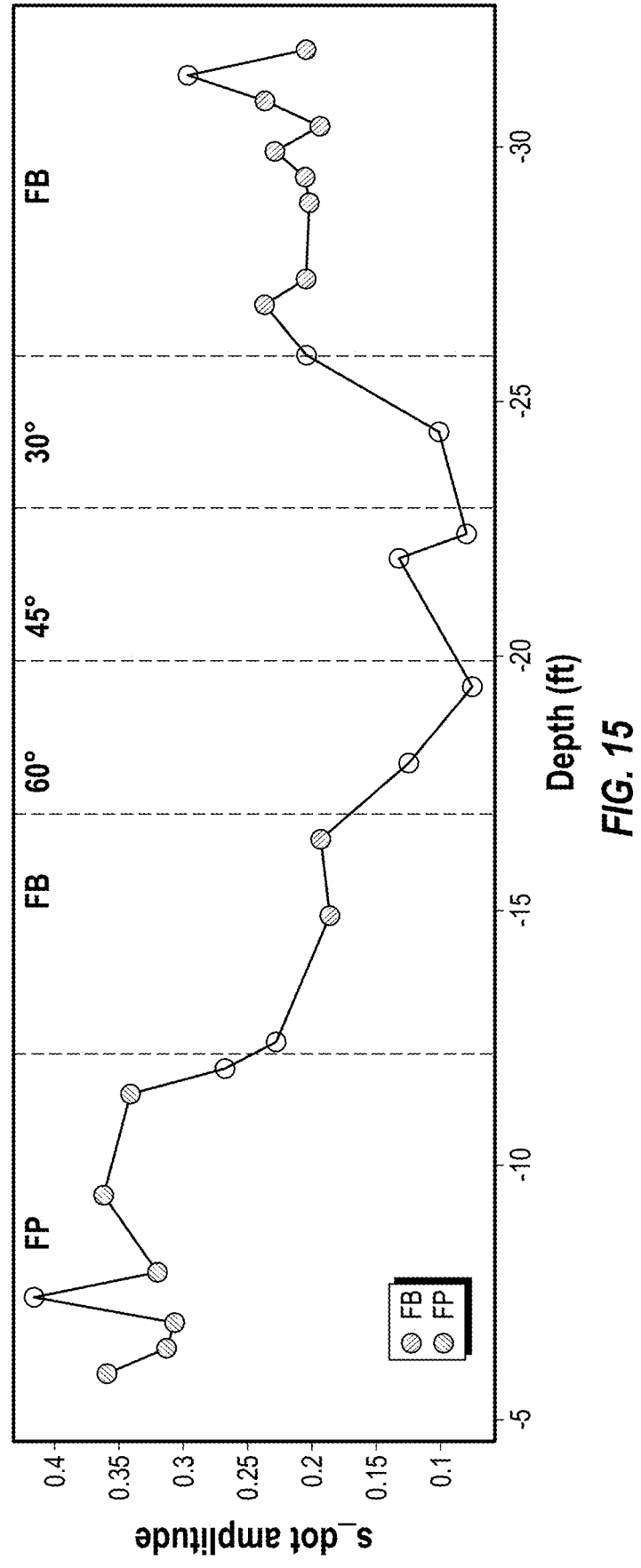
FIG. 15 shows an example of using a machine learning clustering algorithm to identify fully bonded and free pipe signals.

Referring back to block 1412, in examples, during evaluation it may be observed that not all remaining signals may be eliminated from a partially bonded section. Thus, in Block 1416, fully bonded signals and free pipe signals are differentiated utilizing a machine learning algorithm. FIG. 15 shows an example of using a machine learning clustering algorithm (i.e., such as discussed above in FIG. 3) to identify fully bonded and free pipe signals. A clustering algorithm is usually unsupervised, so there is no training may be utilized. However, the clustering algorithm may utilize tuned parameters, such as the minimum distance between groups or the minimum number of points from a dense region. The tuning may be done from experimental data or past logging data and then applied to new data. The assumption is that fully bonded or free pipe signals has similar waveforms, while partially bonded cases have dissimilar waveforms based on their fluid channel size and channel directions. The method DBSCAN (Density-based spatial clustering of applications with noise) is used on dot product data to eliminate isolated dissimilar signals leaving only free pipe signals and fully bonded signals as two identified clusters. After eliminating the signals from partially bonded depth, the remaining signals are from fully bonded or free pipe depth. The remaining signals may be differentiated based on amplitude, as free pipe signals may have higher signal amplitude. Additionally, in block 1418, the median of fully bonded or free pipe signals may be used for baseline removal as described in workflow 800 and workflow 1000, described above in FIGS. 8 and 10, respectively.

FIGS. 16A-16C illustrate graphs in which data-driven baseline selection from workflow 1400 is applied to simulation signals of a test well with different bonding conditions. The true bonding condition is labeled in along the Y axis. The auto-selected fully bonded signal after baseline removal is shown as lines 1600. Workflow 1400 correctly identified signals from fully bonded sections.

Figures 17A, 17B, 17C:
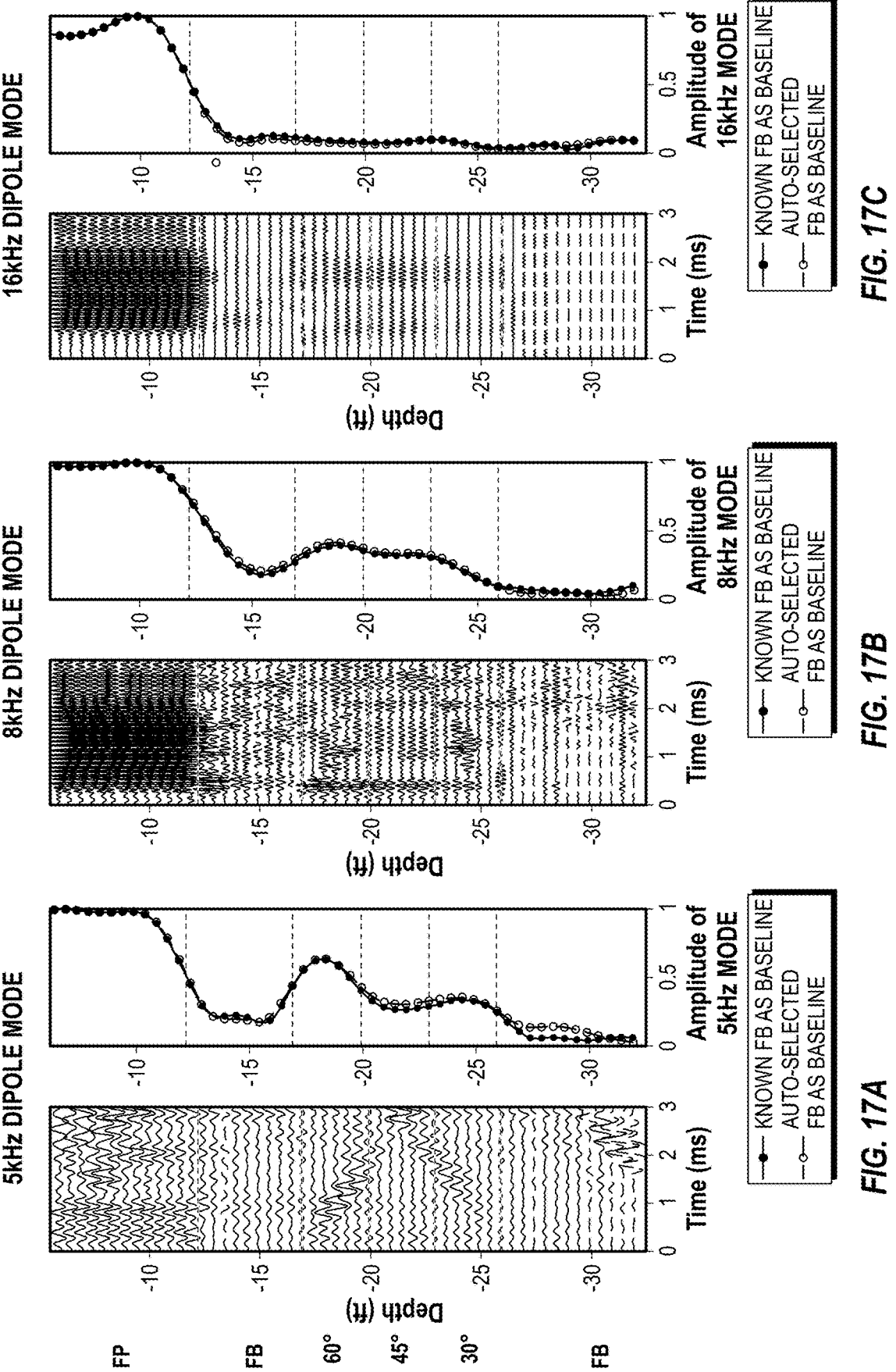
FIGS. 17A-17C illustrate graphs in which data-driven baseline selections from the workflow for data-drive baseline selection are applied to simulation results.

FIGS. 17A-17C illustrates graphs in which data-driven baseline selections from workflow 1400 are applied to experimental results. As seen in the graphs of FIGS. 17A-17C experimental signals are less ideal and are affected by reflections or noises. The fully bonded signal has variations due to other effects. Nonetheless, the algorithm may identify signals from both upper and lower fully bonded sections. Additionally, the resulted 1D log for each graph agrees with previous processing in which we use fully bonded depth as a prior knowledge.

The systems and methods described above may be utilized for both through tubing cement evaluation and traditional cement evaluation without the tubing. It MAY be applied to various types of wave modes such as resonance modes, guided wave S0 mode, A0 mode and fluid mode. For example, for guided wave S0 mode, the guided wave from a fully bonded section may be used as a baseline and subtract from signals from other depths. The remaining signal has higher sensitivity to bonding condition.

The methods and systems described above are an improvement over current technology in the method and systems used enhanced the sensitivity of cement bonding log, especially between the fully bonded section and the partially bonded section with small fluid channel (i.e., partially bonded sections). Current technology does not perform baseline removal, which reduced that signal to noise ratio (SNR). A reduced SNR make identifying between fully bonded, partially bonded, or free pipe difficult. This is because the noise measured and recorded during measurement operations alters and/or obscures signals that identifying fully bonded, partially bonded, or free pipe. The systems and methods disclosed herein may include any of the various features of the systems and methods disclosed herein, including one or more of the following statements.

Statement 1: A method that may comprise disposing an acoustic logging tool in a wellbore, broadcasting a shaped signal with the acoustic logging tool such that the shaped signal interacts with a boundary of a casing and a material, recording a result signal from the boundary with the acoustic logging tool, and decomposing the result signal into a resonance mode. The method may further comprise applying a bandpass filter to the resonance mode to form a filtered signal, selecting a baseline signal from the filtered signal, removing the baseline signal from the filtered signal, and generating a log from the filtered signal.

Statement 2: The method of statement 1, wherein the baseline signal is from a fully bonded signal.

Statement 3: The method of statements 1 or 2, wherein the baseline signal is from a free pipe signal.

Statement 4. The method of any previous statements 1-3, further comprising removing propagating waves from the filtered signal.

Statement 5. The method of any previous statements 1-4, further comprising altering the filtered signal from a time domain signal to a frequency domain signal.

Statement 6. The method of any previous statements 1-5, further comprising normalizing the log between a fully bonded signal and a free pipe signal.

Statement 7. The method of any previous statements 1-6, wherein the decomposing the result signal into a resonance mode forms a monopole, a dipole, a quadrupole, a unipole, or a higher azimuthal order source.

Statement 8. The method of any previous statements 1-7, further comprising selecting a waveform from the result signal.

Statement 9. The method of statement 8, further comprising subtracting the waveform from the result signal to form one or more remaining signals.

Statement 10. The method of statement 9, further comprising identifying if the one or more remaining signals are in phase or out of phase.

Statement 11. The method of statement 10, wherein the one or more remaining signals that are in phase are from a fully bonded signal or a free pipe signal.

Statement 12. The method of statement 10, wherein the remaining signals that are out of phase are from a partially bonded section.

Statement 13. A system may comprise an acoustic logging tool. The acoustic logging tool may comprise at least one transmitter, wherein the at least one transmitter is configured to broadcast a shaped signal such that the shaped signal interacts with a boundary of a casing and a material, and at least one receiver, wherein the at least one receiver is configured to record a result signal from the boundary with the receiver. The system may further comprise a conveyance, wherein the conveyance is attached to the acoustic logging tool and an information handling system communicatively connected to the acoustic logging tool. The information handling system may be configured to decompose the result signal into a resonance mode, apply a bandpass filter to the resonance mode to form a filtered signal, select a baseline signal from the filtered signal, remove the baseline signal from the filtered signal, and generate a log from the filtered signal.

Statement 14. The system of statement 13, wherein the baseline signal is from a fully bonded signal.

Statement 15. The system of statements 13 or 14, wherein the baseline signal is from a free pipe signal.

Statement 16. The system of any previous statements 13-15, wherein the information handling system is further configured to remove propagating waves from the filtered signal.

Statement 17. The system of any previous statements 13-16, wherein the information handling system is further configured to alter the filtered signal from a time domain signal to a frequency domain signal.

Statement 18. The system of any previous statements 13-17, wherein the information handling system is further configured to normalize the log between a fully bonded signal and a free pipe signal.

Statement 19. The system of any previous statements 13-18, wherein the decompose the result signal into a resonance mode forms a monopole, a dipole, a quadrupole, a unipole, or a higher azimuthal order source.

Statement 20. The system of any previous statements 13-19, wherein the information handling system is further configured to select a waveform from the result signal, subtract the waveform from the result signal to form one or more remaining signals, and identify if the one or more remaining signals are in phase or out of phase.

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method, comprising:
disposing an acoustic logging tool in a wellbore;

broadcasting a shaped signal with the acoustic logging tool such that the shaped signal interacts with a boundary of a casing and a material;
recording a result signal from the boundary of the casing and the material with the acoustic logging tool;
selecting a baseline signal to be subtracted from the result signal;
subtracting the baseline signal from the result signal to yield a subtracted signal; and
determining a bonding condition associated with the material based on the subtracted signal by generating a log from the result signal, where the bonding condition comprises free pipe, partially bonded, or fully bonded.

2. The method of claim 1, further comprising decomposing the result signal into a resonance mode; applying a bandpass filter to the resonance mode to form a filtered signal; selecting the baseline signal from the filtered signal, wherein the baseline signal is from a fully bonded signal; and removing the baseline signal from the filtered signal to yield the subtracted signal.

3. The method of claim 2, wherein the baseline signal is from a free pipe signal.

4. The method of claim 2, further comprising removing propagating waves from the filtered signal.

5. The method of claim 2, further comprising altering the filtered signal from a time domain signal to a frequency domain signal.

6. The method of claim 2, further comprising normalizing the log between the fully bonded signal and a free pipe signal.

7. The method of claim 2, wherein the decomposing the result signal into the resonance mode forms a monopole, a dipole, a quadrupole, a unipole, or a higher azimuthal order source.

8. The method of claim 2, further comprising selecting a waveform from the result signal, wherein the waveform is the baseline signal.

9. The method of claim 8, further comprising subtracting the waveform from the result signal to form the subtracted signal.

10. The method of claim 9, further comprising identifying if one or more remaining signals are in phase or out of the phase.

11. The method of claim 10, wherein the one or more remaining signals that are in the phase are from the fully bonded signal or a free pipe signal.

12. The method of claim 10, wherein the one or more remaining signals that are out of the phase are from a partially bonded section.

13. A system comprising:
an acoustic logging tool, wherein the acoustic logging tool comprises:
at least one transmitter, wherein the at least one transmitter is configured to broadcast a shaped signal such that the shaped signal interacts with a boundary of a casing and a material; and
at least one receiver, wherein the at least one receiver is configured to record a result signal from the boundary of the casing and the material with the receiver;
a conveyance, wherein the conveyance is attached to the acoustic logging tool; and
an information handling system communicatively connected to the acoustic logging tool, wherein the information handling system is configured to:
select a baseline signal to be subtracted from the result signal;

subtract the baseline signal from the result signal to yield a subtracted signal; and determine a bonding condition associated with the material based on the subtracted signal by generating a log from the result signal, wherein the bonding condition comprises free pipe, partially bonded, or fully bonded.

14. The system of claim 13, wherein the information handling system is further configured to: decompose the result signal into a resonance mode; apply a bandpass filter to the resonance mode to form a filtered signal; select the baseline signal from the filtered signal, wherein the baseline signal is from a fully bonded signal; and remove the baseline signal from the filtered signal to yield the subtracted signal.

15. The system of claim 14, wherein the baseline signal is from a free pipe signal.

16. The system of claim 14, wherein the information handling system is further configured to remove propagating waves from the filtered signal.

17. The system of claim 14, wherein the information handling system is further configured to alter the filtered signal from a time domain signal to a frequency domain signal.

18. The system of claim 14, wherein the information handling system is further configured to normalize the log between the fully bonded signal and a free pipe signal.

19. The system of claim 14, wherein decomposing the result signal into the resonance mode forms a monopole, a dipole, a quadrupole, a unipole, or a higher azimuthal order source.

20. The system of claim 14, wherein the baseline signal is a waveform selected form the result signal, and wherein the information handling system is further configured to subtract the waveform from the result signal to form the subtracted signal, and identify if the one or more remaining signals are in phase or out of the phase.

* * * * *